: (12) United States Patent
Nakamura et al.

(10) Patent No.: US 10,565,727 B2
(45) Date of Patent: Feb. 18, 2020

(54) APPARATUS AND METHOD OF GENERATING THREE-DIMENSIONAL DATA, AND MONITORING SYSTEM INCLUDING THREE-DIMENSIONAL DATA GENERATION APPARATUS

(71) Applicant: FANUC CORPORATION, Yamanashi (JP)

(72) Inventors: Minoru Nakamura, Yamanashi (JP); Atsushi Watanabe, Yamanashi (JP); Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 220 days.

(21) Appl. No.: 15/708,529

(22) Filed: Sep. 19, 2017

(65) Prior Publication Data

US 2018/0082440 A1  Mar. 22, 2018

(30) Foreign Application Priority Data

Sep. 20, 2016  (JP) ................. 2016-183208

(51) Int. Cl.
*G06T 7/73* (2017.01)
*G06T 7/11* (2017.01)
(Continued)

(52) U.S. Cl.
CPC .............. *G06T 7/74* (2017.01); *G06K 9/6212* (2013.01); *G06T 7/11* (2017.01); *G06T 7/77* (2017.01);
(Continued)

(58) Field of Classification Search
CPC ...... G06T 7/74; G06T 7/11; G06T 7/77; G06T 2200/08; G06T 2200/04;
(Continued)

(56) References Cited

U.S. PATENT DOCUMENTS

| 4,650,333 A | 3/1987 | Crabb et al. |
| 8,547,448 B2 | 10/2013 | Shikatani et al. |
| 2010/0092038 A1 | 4/2010 | Theodore et al. |

FOREIGN PATENT DOCUMENTS

| JP | S49045312 Y | 12/1974 |
| JP | S50031031 B | 10/1975 |

(Continued)

*Primary Examiner* — Amandeep Saini
(74) *Attorney, Agent, or Firm* — RatnerPrestia

(57) ABSTRACT

A three-dimensional data generation apparatus using measurement data from a three-dimensional sensor. The apparatus includes a measured coordinates obtaining section for obtaining measured coordinates of an object in a three-axis rectangular coordinate system set in an observation area, based on measurement data from a three-dimensional sensor measuring the observation area; and a subdivision information preparing section for defining a reference plane parallel to an X-Y plane of the three-axis rectangular coordinate system in the observation area, uniformly divide the reference plane into a plurality of subdivisions, and assign to a subdivision, among the subdivisions, that contains X-Y coordinate values of the measured coordinates of the object, a Z value of the same measured coordinates as a representative height of the subdivision. Three-dimensional data of the observation area is generated by using a position and dimensions in the reference plane and the representative height, of each of the subdivisions.

13 Claims, 18 Drawing Sheets

(51) Int. Cl.
  *G06T 7/77* (2017.01)
  *G06K 9/62* (2006.01)
(52) U.S. Cl.
  CPC ...... *G06T 2200/04* (2013.01); *G06T 2200/08* (2013.01); *G06T 2207/10028* (2013.01); *G06T 2207/20021* (2013.01); *G06T 2207/30196* (2013.01); *G06T 2207/30232* (2013.01)
(58) Field of Classification Search
  CPC . G06T 2207/30232; G06T 2207/10028; G06T 2207/20021; G06T 2207/30196; G06K 9/00771; G06K 9/00201; G06K 9/6212
  USPC .......................................................... 382/103
  See application file for complete search history.

(56) References Cited

FOREIGN PATENT DOCUMENTS

| | | |
|---|---|---|
| JP | S60219504 A | 11/1985 |
| JP | H09-130781 A | 5/1997 |
| JP | 2004163200 A | 6/2004 |
| JP | 2005157635 A | 6/2005 |
| JP | 2010160785 A | 7/2010 |
| JP | 2014214566 A | 11/2014 |
| JP | 2015120573 A | 7/2015 |

APPARATUS AND METHOD OF GENERATING THREE-DIMENSIONAL DATA, AND MONITORING SYSTEM INCLUDING THREE-DIMENSIONAL DATA GENERATION APPARATUS

BACKGROUND OF THE INVENTION

1. Field of the Invention

The present invention relates to a three-dimensional data generation apparatus and a three-dimensional data generation method, which generate three-dimensional data used for recognizing an object present in an observation area. The present invention also relates to a monitoring system including a three-dimensional data generation apparatus.

2. Description of the Related Art

Systems that monitor an observation area having a predetermined spatial extensity by using image information acquired by capturing an image of the observation area are known. For example, Japanese Unexamined Patent Publication No. H09-130781 (JPH09-130781A) discloses a wide-area monitoring apparatus that monitors a moving object such as a person or a vehicle across a wide area. The wide-area monitoring apparatus includes a moving object recognition device that detects a position and a feature quantity, of a moving object, from image information of an area to be monitored and converts the position of the moving object into coordinates on a map of the area to be monitored so as to output the coordinates and the feature quantity; an individual identification device that detects identification information of the moving object; a verification device that verifies the identification information of the moving object against previously registered identification information and outputs a verification result; and a moving object tracking device that links information of the coordinates and feature quantity of the moving object with the identification information and the verification result and tracks the moving object on the map of the area to be monitored.

SUMMARY OF THE INVENTION

In a system that monitors an observation area by using image information, depending on a positional relationship between an image capturing section of a sensor that acquires the image information and an object present in the observation area, a zone (a so-called "blind spot"), of which image information cannot be acquired, may sometimes be caused since it is located behind the object as viewed from the image capturing section. When the blind spot is caused, it is difficult to recognize the state of a space corresponding to the blind spot and, if two objects are overlapping with each other as viewed from the image capturing section, it is also difficult to grasp a distance between the objects. In general, it is possible to eliminate a blind spot by increasing the number of image capturing sections. However, in a system that automatically monitors an observation area based on image information, for example, the increased calculation amount for recognizing an object by combining image information from individual image capturing sections may result in a drop in a processing speed, and in a system where an observer monitors at any time a monitor screen displaying the image of an observation area, the increased number of image capturing sections and monitor screens may result in a complicated monitoring operation.

One aspect of the present invention is a three-dimensional data generation apparatus configured to generate three-dimensional data used for recognizing an object present in an observation area, the apparatus including a measured coordinates obtaining section configured to obtain measured coordinates of the object in a three-axis rectangular coordinate system set in the observation area, based on measurement data from a three-dimensional sensor that measures the observation area; and a subdivision information preparing section configured to define a reference plane parallel to an X-Y plane of the three-axis rectangular coordinate system in the observation area, uniformly divide the reference plane into a plurality of subdivisions, and assign to a subdivision, among the plurality of subdivisions, that contains X-Y coordinate values of the measured coordinates of the object, a Z value of the same measured coordinates as a representative height of the subdivision, wherein three-dimensional data of the observation area is generated by using a position and dimensions in the reference plane and the representative height, of each of the plurality of subdivisions.

Another aspect of the present invention is a three-dimensional data generation method of generating three-dimensional data used for recognizing an object present in an observation area, the method including obtaining measured coordinates of the object in a three-axis rectangular coordinate system set in the observation area, based on measurement data from a three-dimensional sensor that measures the observation area; defining a reference plane parallel to an X-Y plane of the three-axis rectangular coordinate system in the observation area, uniformly dividing the reference plane into a plurality of subdivisions, and assigning to a subdivision, among the plurality of subdivisions, that contains X-Y coordinate values of the measured coordinates of the object, a Z value of the same measured coordinates as a representative height of the subdivision; and generating three-dimensional data of the observation area by using a position and dimensions in the reference plane and the representative height, of each of the plurality of subdivisions.

Yet another aspect of the present invention is a monitoring system including a three-dimensional sensor configured to measure an observation area; and the aforementioned three-dimensional data generation apparatus, wherein the observation area is monitored by using the three-dimensional data generated by the three-dimensional data generation apparatus.

In the three-dimensional data generation apparatus according to one aspect, the three-dimensional data prepared by representing the observation area with use of a plurality of subdivisions, each having the position and dimensions in the reference plane and the representative height, is generated based on the measurement data from the three-dimensional sensor that has measured the observation area. The three-dimensional data is generated in such a manner that a blind spot caused in the observation area due to a positional relationship between the three-dimensional sensor and the object is represented as a subdivision not having a representative height and thus is distinguishable from the other subdivision having the representative height. Accordingly, the blind spot in the observation area can be accurately recognized by referring to the generated three-dimensional data. Additionally, a distance between two objects present in the observation area can be readily grasped based on the position and dimensions, in the reference plane, of a subdivision present between the objects. In addition to eliminating the blind spot by increasing the number of three-dimensional sensors, a residual blind spot can be represented in a form distinguishable from the object in a single image, and therefore, in the case where the three-dimensional data generation apparatus is used in, for example, a monitoring system in which an observer monitors at any time the three-dimensional data displayed as an image on a monitor screen, it is not necessary for the observer to carry out a complicated monitoring operation such as comparing images corresponding to the plurality of three-dimensional sensors and determining whether or not a blind spot is caused. Furthermore, the configuration wherein the three-dimensional data is generated by using the position and dimensions in the reference plane and the representative height, of each of the plurality of subdivisions formed by uniformly dividing the reference plane, makes it possible, for the case where the three-dimensional data generation apparatus is used in, for example, a monitoring system in which a computer, etc., automatically monitors the observation area based on the three-dimensional data, to suppress an increase in the calculation amount for recognizing the object and the blind spot by combining the measurement data from respective three-dimensional sensors, even when the number of three-dimensional sensors is increased, and therefore, it is possible to prevent a drop in a processing speed.

The three-dimensional data generation method according to another aspect may have effects equivalent to the above-described effects of the three-dimensional data generation apparatus.

In the monitoring system according to another aspect, which includes the three-dimensional data generation apparatus, it is possible to accurately recognize a blind spot in the observation area and readily grasp a distance between the objects. Additionally, even in the case where the number of three-dimensional sensors is increased in order to eliminate a blind spot, it is possible to eliminate a complicated monitoring operation such that an observer compares images corresponding to the plurality of three-dimensional sensors to determine whether or not the blind spot is caused, or it is possible to suppress an increase in the calculation amount for recognizing the object and the blind spot by combining the measurement data from the respective three-dimensional sensors and thereby to prevent a drop in a processing speed. Furthermore, using the three-dimensional data generated by the three-dimensional data generation apparatus with the same period as a measurement period previously set in the three-dimensional sensors relating to the observation area, makes it possible to continuously monitor the observation area in real time.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
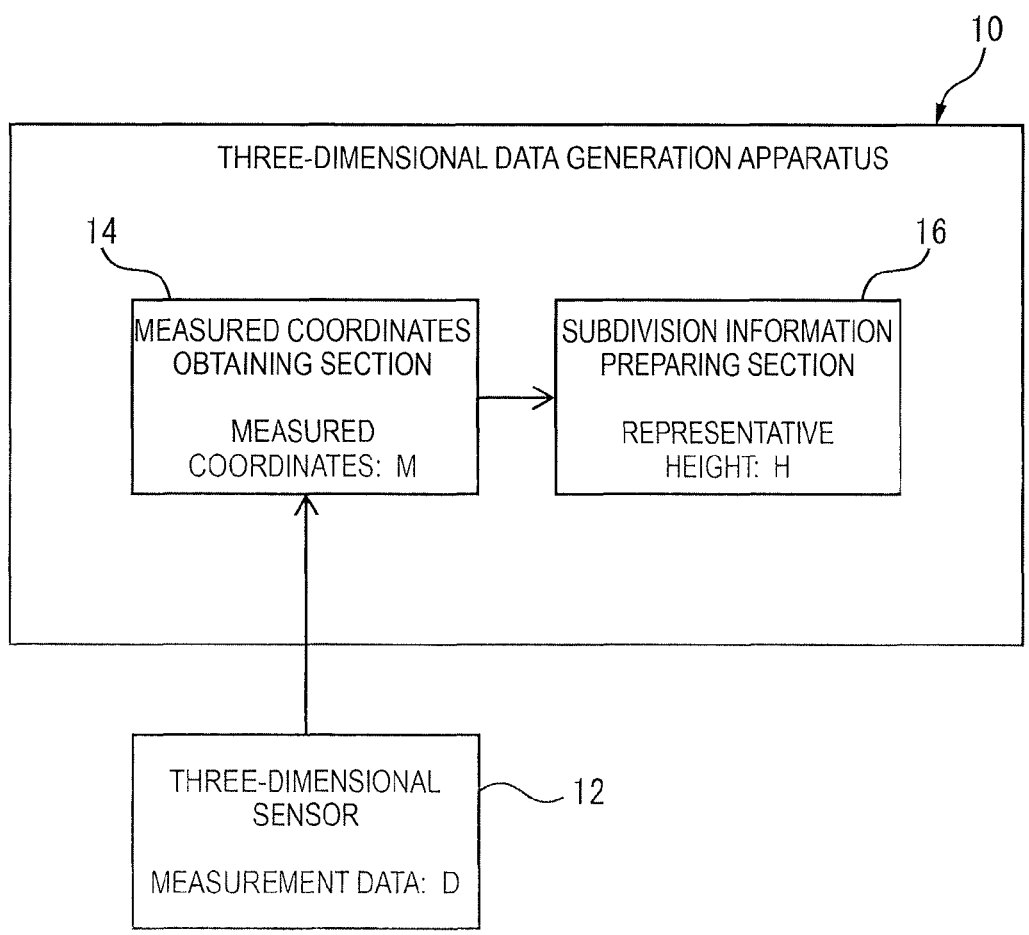
FIG. 1 is a functional block diagram illustrating a basic configuration of a three-dimensional data generation apparatus according to one embodiment.

Embodiments of the present invention will be described below with reference to the accompanying drawings. Throughout the drawings, corresponding components are denoted by common reference numerals.

FIG. 1 is a functional block diagram illustrating a basic configuration of a three-dimensional data generation apparatus 10 according to one embodiment. The three-dimensional data generation apparatus 10 has a configuration for generating three-dimensional data used for recognizing an object present in an observation area having a predetermined spatial extensity, and may be configured as, for example, a function (hardware and software) of a computer (or a processor). The three-dimensional data generation apparatus 10 includes a measured coordinates obtaining section 14 configured to obtain measured coordinates M of the object in a three-axis rectangular coordinate system set in the observation area, based on measurement data D from a three-dimensional sensor 12 that measures the observation area; and a subdivision information preparing section 16 configured to define a reference plane parallel to an X-Y plane of the three-axis rectangular coordinate system in the observation area, uniformly divide the reference plane into a plurality of subdivisions, each of which can be measured by the three-dimensional sensor 12, and assign to a subdivision, among the plurality of subdivisions, that contains X-Y coordinate values of the measured coordinates M of the object, a Z value of the same measured coordinates M as a representative height H of the subdivision. The three-dimensional data generation apparatus 10 is configured to generate the three-dimensional data of the observation area by using a position and dimensions in the reference plane and the representative height H, of each of the plurality of subdivisions. A three-dimensional data generation method executed by the three-dimensional data generation apparatus 10 will be described in detail later.

Figure 2:
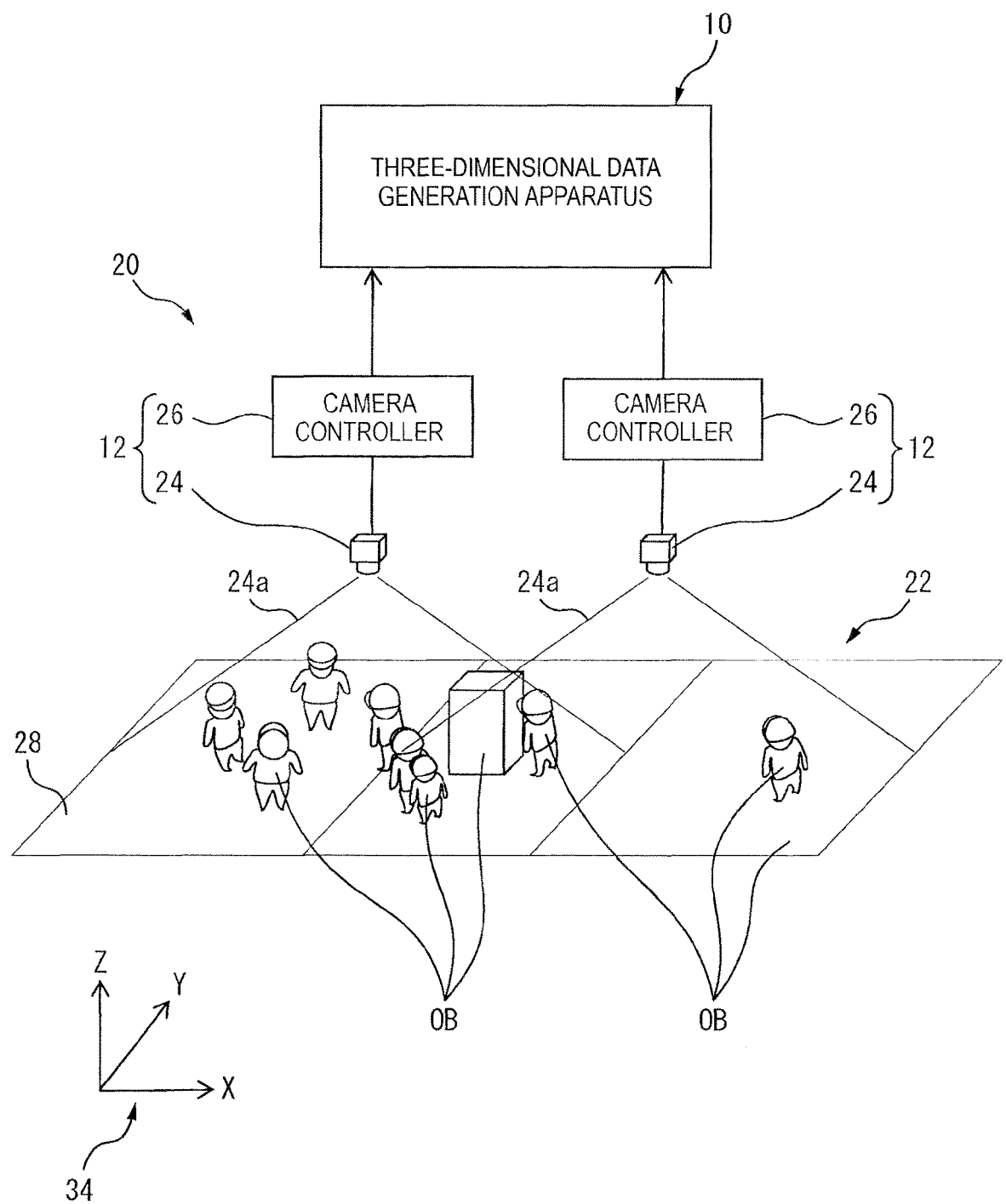
FIG. 2 is a diagram conceptually illustrating the configuration of a monitoring system according to one embodiment.

FIG. 2 conceptually illustrates a configuration of a monitoring system 20 according to one embodiment. The monitoring system 20 has a configuration for monitoring an observation area 22 by using three-dimensional data generated by a three-dimensional data generation apparatus 10, and includes the three-dimensional data generation apparatus 10 and a three-dimensional sensor 12 configured to measure the observation area 22. The three-dimensional sensor 12 includes an image capturing section (hereinafter referred to as a camera) 24 that captures an image of a subject, and a camera controller 26 that controls the image capturing operation of the camera 24. The camera controller 26 can compute measurement data D from position information of the subject captured by the camera 24, or carry out a suitable image processing on the measurement data D. Alternatively, the three-dimensional data generation apparatus 10 may be provided with data computing function or image processing function.

In the embodiment of FIG. 2, the monitoring system 20 includes two cameras 24, each of which is a component of the three-dimensional sensor 12. Each camera 24 is arranged at a predetermined position spaced vertically above a floor surface 28 of the observation area 22. The cameras 24 are located at positions where visual fields 24a thereof partially overlap with each other and at least the entire floor surface 28 can be captured by the cooperation of the cameras 24. In the observation area 22, an immovable structure, such as a floor, a wall, equipment, etc., is continuously present, and further a moving object, such as a person, a mobile machine, etc., is continuously or temporarily present (the immovable structure and the moving object will be referred to generically as an object OB). Preferably, each camera 24 is arranged at a position higher than the actual height of all objects OB that can be observed in the observation area 22. Provided that the measurement data D of the object OB can be generated throughout the entire observation area 22, the number of the cameras 24 (i.e., the number of the three-dimensional sensors 12) is not limited to two, and may be one, or three or more.

Figure 3A:
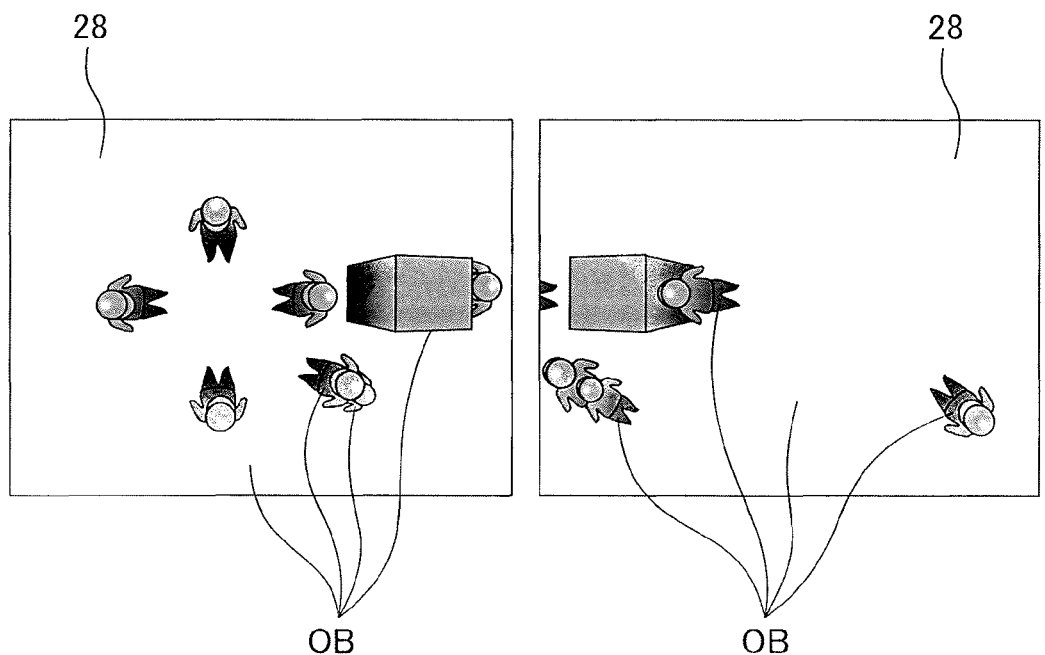
FIG. 3A is a diagram illustrating an example of a monitoring image generated by a conventional monitoring system.

FIG. 3A illustrates, for comparison, an exemplary monitoring image prepared by imaging, through a conventional procedure, measurement data D acquired by two cameras 24 that capture the image of the observation area 22 of FIG. 2. The diagram on the left side of FIG. 3A illustrates a monitoring image captured by the camera 24 arranged at the left upper side of the observation area 22 of FIG. 2. The diagram on the right side of FIG. 3A illustrates a monitoring image captured by the camera 24 arranged at the right upper side of the observation area 22 of FIG. 2. As illustrated, when the measurement data D acquired by the three-dimensional sensor 12 is imaged through the conventional procedure, the object OB is represented in a perspective view containing height information (represented by, e.g., color). In this procedure, a zone located behind the object OB as viewed from the camera 24 becomes a blind spot and thus cannot be imaged, since the image information of the zone cannot be acquired. The provision of two cameras 24 may make it possible for one camera 24 to image a zone that is a blind spot with respect to the other camera 24. However, in a configuration where, for example, an observer monitors at any time a monitor screen displaying the image of the observation area 22, the increased number of cameras 24 and monitor screens makes it necessary for the observer to compare the images from two cameras 24 and determine whether or not a blind spot is present. Further, when the object OB is represented in a perspective view, it is difficult to grasp a distance between the objects OB, in particular, the objects OB located adjacent to each other in a radial direction about an optical axis of the camera 24.

Figure 3B:
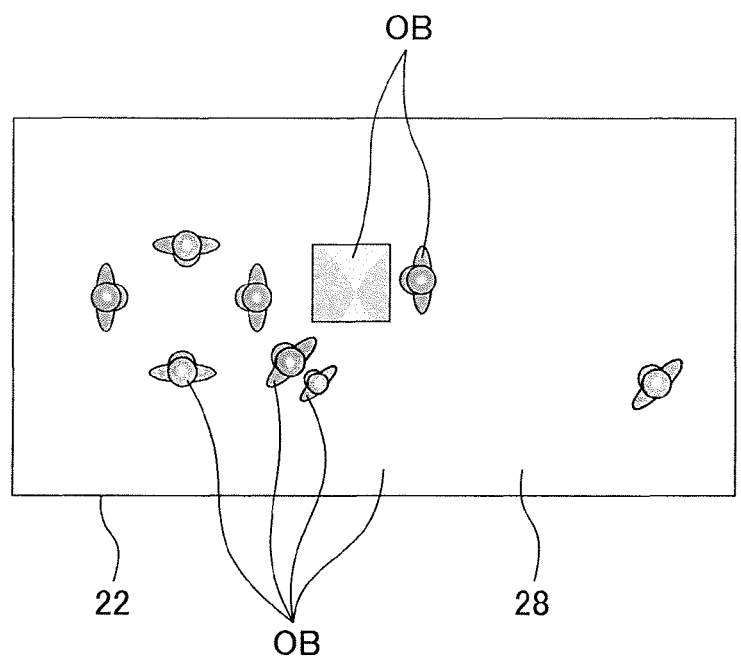
FIG. 3B is a diagram illustrating an example of a monitoring image generated by the monitoring system of FIG. 2.

On the other hand, FIG. 3B illustrates an exemplary monitoring image prepared by imaging the three-dimensional data generated by the three-dimensional data generation apparatus 10 in the monitoring system 20. As illustrated, in the three-dimensional data generation apparatus 10, despite using the measurement data D from two cameras 24 just like the procedure illustrated in FIG. 3A, the three-dimensional data corresponding to a combination of the measurement data D from two cameras 24 is generated, and thereby the object OB is represented in a single plan view containing height information (represented by, e.g., color), as if the entire observation area 22 was captured in a bird's-eye view from a position at infinity vertically above the floor surface 28. In this manner, according to the three-dimensional data generation apparatus 10, it is possible to visualize a zone located behind the object OB as viewed from the camera 24 together with the other zone in a single image. As a result, in a configuration where, for example, an observer monitors at any time a monitor screen displaying the image of the observation area 22, the observer does not need to compare the images from two cameras 24 and determine whether or not a blind spot is present. Further, the object OB is represented in a plan view, and thereby it is possible to readily grasp a distance between the objects OB located adjacent to each other in a radial direction about an optical axis of the camera 24 in a single image.

Figure 4:
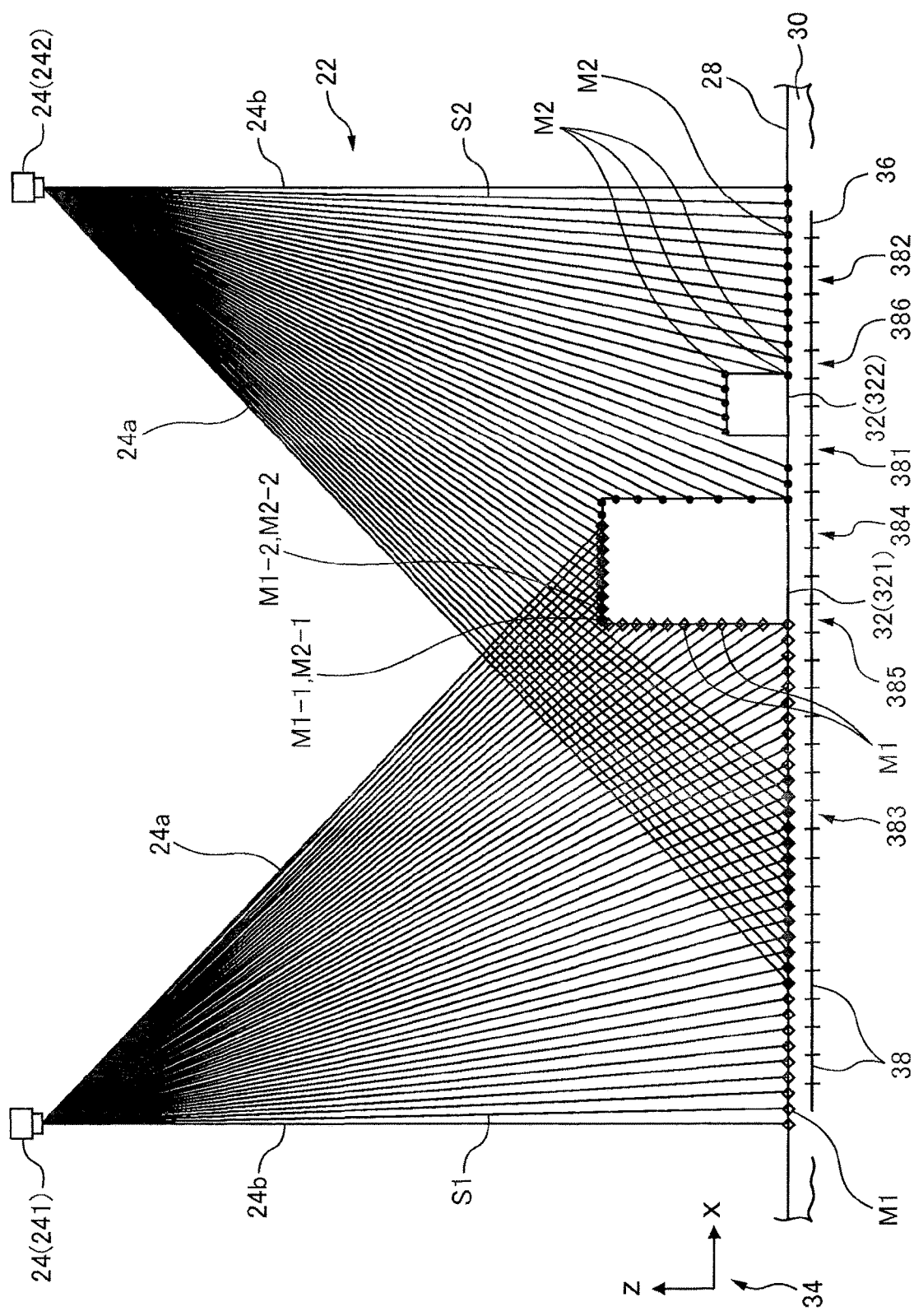
FIG. 4 is a diagram conceptually illustrating a three-dimensional data generation method according to one embodiment.
Figure 5:
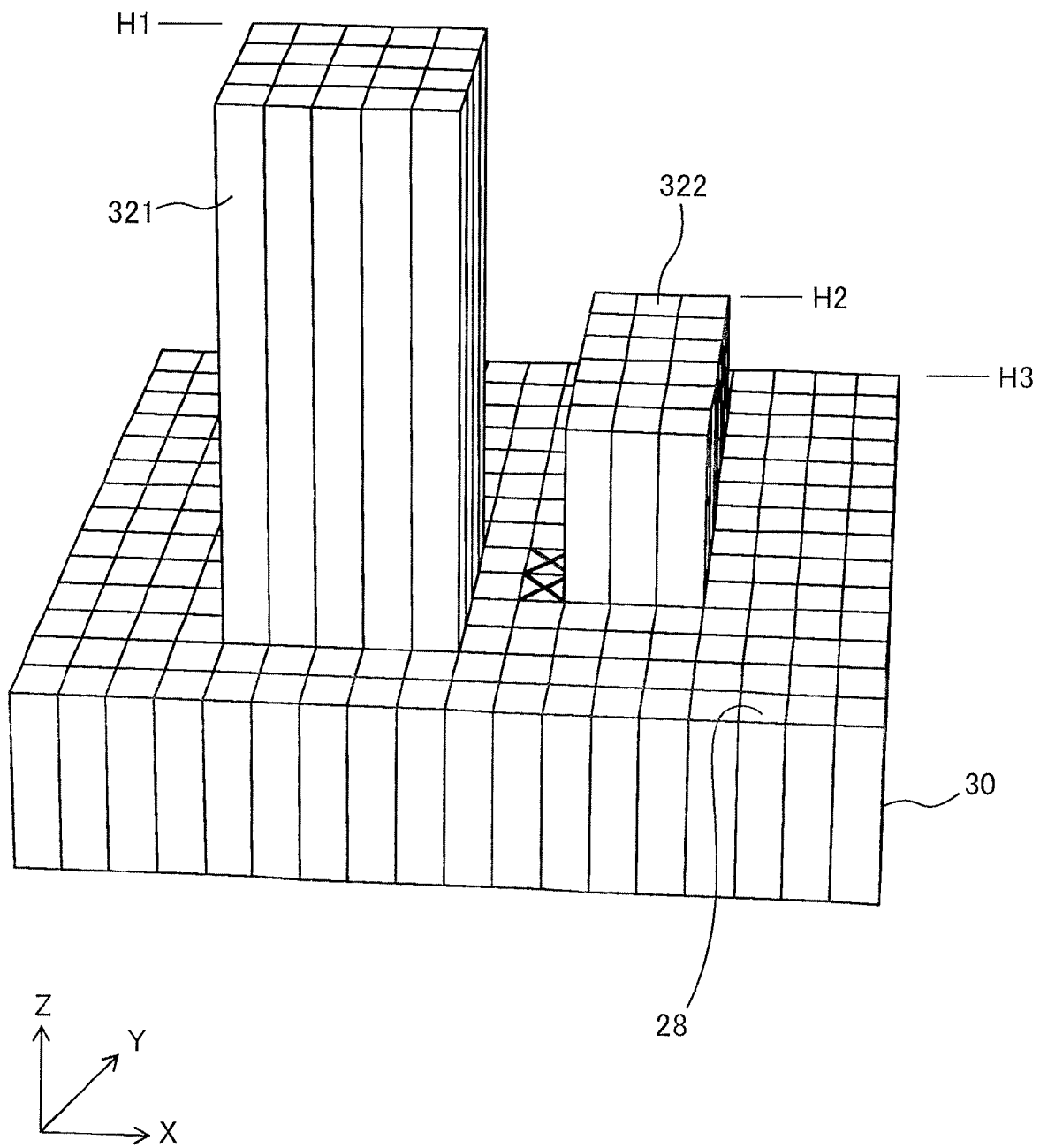
FIG. 5 is a diagram conceptually illustrating an example of three-dimensional data generated by a three-dimensional data generation apparatus.

FIG. 4 conceptually illustrates a three-dimensional data generation method according to one embodiment, carried out in the monitoring system 20 including two cameras 24 (FIG. 2). FIG. 5 conceptually illustrates an example of three-dimensional data generated by the three-dimensional data generation apparatus 10. The configuration of the embodiment of the three-dimensional data generation method performed by the three-dimensional data generation apparatus 10 will be described with reference to FIGS. 1 to 5.

As illustrated in FIG. 4, a floor 30 having the floor surface 28 and large and small structures 32 placed on the floor surface 28 (a left-side structure 321 and a right-side structure 322) are present as a plurality of objects OB in the observation area 22. FIG. 4 illustrates a situation in which two cameras 24 (a left-side camera 241 and a right-side camera 242) measure the three-dimensional positions of the surfaces of the plurality of objects OB, in a simplified manner in an X-Z plane of a three-axis rectangular coordinate system 34 set in the observation area 22 (FIG. 2). The three-axis rectangular coordinate system 34 is a global coordinate system for the monitoring system 20, and is set in the observation area 22 in an orientation wherein X axis and Y axis are positioned parallel to the floor surface 28 and a positive direction of Z axis is directed vertically upward with respect to the floor surface 28.

In FIG. 4, a plurality of solid lines S1 and S2 radially extending downward from the respective cameras 241 and 242 represent light rays from the objects OB incident on a plurality of light-receiving elements of a sensor chip (or an imaging device) of each camera 241, 242. The camera 241 acquires, in the respective light-receiving elements, position information of intersections M1 of the respective solid lines S1 with the surface of the object OB, and the camera 242 acquires, in the respective light-receiving elements, position information of intersections M2 of the respective solid lines S2 and the surface of the object OB. The camera controller 26 (FIG. 2) can compute the measurement data D of the surface of the object OB based on the position information (so-called raw data) of the intersections M1 and M2 (hereinafter referred to as image-capturing points M1 and M2). FIG. 4 illustrates the right half of the visual field 24a of the camera 241 and an optical axis 24b thereof at the center of the visual field, and the left half of the visual field 24a of the camera 242 and an optical axis 24b thereof at the center of the visual field.

As illustrated in FIG. 4, the camera 241 can capture an image (or acquire the position information of the image-capturing points M1) of a part of the top surface and the left side surface of the larger structure 321, and the floor surface 28 located closer to the camera 241 than the structure 321. However, the camera 241 cannot capture an image of the remaining part of the top surface and the right side surface of the structure 321, as well as the smaller structure 322 and the floor surface 28 located farther away from the camera 241 than the structure 321. On the other hand, the camera 242 can capture an image (or acquire the position information of the image-capturing points M2) of the top surface and the right side surface of the smaller structure 322, the top surface and the right side surface of the larger structure 321, the floor surface 28 located closer to the camera 242 than the structure 322, a part of the floor surface 28 located between the structure 322 and the structure 321, and a part of the floor surface 28 located farther away from the camera 242 than the structure 321. However, the camera 242 cannot capture an image of the left side surface of the structure 322, the left side surface of the structure 321, the remaining part of the floor surface 28 located between the structure 322 and the structure 321, and the remaining part of the floor surface 28 located farther away from the camera 242 than the structure 321. The remaining part of the floor surface 28 located between the structure 322 and the structure 321 is a blind spot that cannot be captured by either of the cameras 241 and 242.

Based on the measurement data D from the three-dimensional sensors 12, which is acquired by the cameras 241, 242 capturing images of the observation area 22, the measured coordinates obtaining section 14 (FIG. 1) obtains the measured coordinates M of the surfaces of the structures 321, 322 and the floor surface 28 of the floor 30, in the three-axis rectangular coordinate system 34 set in the observation area 22. The measured coordinates M represent the position information of the image-capturing points M1, M2 captured by the cameras 241, 242 in the three-axis rectangular coordinate system 34 (i.e., X coordinate, Y coordinate and Z coordinate), and are obtained by the measured coordinates obtaining section 14 that executes arithmetic processing, such as coordinate conversion, on the measurement data D of the image-capturing points M1, M2 as necessary. Depending on the type of the three-dimensional sensor 12, the measurement data D used to obtain the measured coordinates M may be the position information (raw data) of the image-capturing points M1, M2 captured by the cameras 241, 242, or may be data acquired through, for example, some kind of arithmetic processing executed on the position information (raw data) by the camera controller 26 (FIG. 2). An example of the arithmetic processing executable by the measured coordinates obtaining section 14 on the measurement data D will be described later.

The subdivision information preparing section 16 (FIG. 1) virtually defines, in the observation area 22, a reference plane 36 parallel to the X-Y plane of the three-axis rectangular coordinate system 34, and uniformly divides the reference plane 36 into a plurality of subdivisions 38, each of which can be measured by the three-dimensional sensors 12 (i.e., from which the cameras 241, 242 can acquire the position information of the image-capturing points M1, M2). The shape of the subdivision 38 formed by uniformly dividing the reference plane 36 may adopt a square for reasons of ease of form interpretation or arithmetic processing, and may adopt a shape other than the square (e.g., another rectangle, a triangle, a hexagon, etc.) provided that the shape enables the reference plane 36 to be divided uniformly. Additionally, the number of the subdivisions 38 formed by uniformly dividing the reference plane 36 and the dimensions of each subdivision 38 are previously set in accordance with the pixel number of each camera 241, 242, the required precision (or resolution) of the three-dimensional data, the permissible size of the blind spot, etc., provided that the camera 241, 242 is configured to have at least one image-capturing point M1, M2 in each subdivision 38. The subdivision information preparing section 16 retains, with respect to each of the plurality of subdivisions 38, the position (i.e., X-Y coordinates of an arbitrary point in the subdivision 38) and dimensions (i.e., an area of the subdivision 38) in the reference plane 36, as information used for generating the three-dimensional data.

The subdivision information preparing section 16 specifies a subdivision 38, among the plurality of subdivisions 38 formed by uniformly dividing the reference plane 36, which contains the X-Y coordinate values of the measured coordinates M in the surface of the structure 321, 322 and the floor surface 28 of the floor 30 (i.e., two-dimensional coordinate values corresponding to the image-capturing point M1, M2). In the observation area 22 illustrated simply in FIG. 4, only a subdivision 381 located correspondingly to a part of the floor surface 28 as a blind spot between the structure 322 and the structure 321, is a subdivision not containing the X-Y coordinate values of the measured coordinates M, and all of the remaining subdivisions 38 contain the X-Y coordinate values of the measured coordinates M. The subdivision information preparing section 16 assigns to the subdivision 38 containing the X-Y coordinate values of the measured coordinates M a Z value of the same measured coordinates M as a representative height H of the subdivision 38. The subdivision information preparing section 16 retains the representative height H of each of the plurality of subdivisions 38 as information used for generating the three-dimensional data.

Once the representative height H has been assigned to each of the subdivisions 38 formed by uniformly dividing the reference plane 36, three-dimensional data corresponding to the profile of a prism (a right prism) having a height H and a bottom face formed of each subdivision 38 is generated. The three-dimensional data represented by the prism with the bottom face formed of each subdivision 38 includes information of a position and bottom-face dimensions in the reference plane 36. The three-dimensional data generation apparatus 10 generates the three-dimensional data of the observation area 22 including the object OB (the structures 321, 322 and the floor 30) by using the position and dimensions in the reference plane 36 and the representative height H, of each of the plurality of subdivisions 38. The three-dimensional data of the observation area 22 of FIG. 4 generated in this manner can be represented by a plurality of prisms (right prisms) assembled with no gap therebetween, the number of which corresponds to the number of the subdivisions 38, as illustrated, e.g., in FIG. 5.

In an example depicted in FIG. 5, the structure 321 is represented by an assembly of 20 (twenty) prisms each having a representative height H1, the structure 322 is represented by an assembly of 18 (eighteen) prisms each having a representative height H2, and the floor 30 is represented by an assembly of a large number of prisms each having a representative height H3. Note that the assembly of prisms representing each object OB is deemed to be a simplified or stylized representation of the object OB, and do not necessarily have a shape identical to the actual shape of the object OB. Increasing the pixel number of the camera 24 as well as the number of the subdivisions 38 formed by uniformly dividing the reference plane 36 makes it possible to approximate the shape of the assembly of prisms to the actual shape of the object OB, and makes it possible to improve the precision (or resolution) of the three-dimensional data.

The above-described three-dimensional data corresponds to an appropriate combination of the measurement data D of the observation area 22 acquired by two three-dimensional sensors 12 and, since the structure 321, 322 is represented by the assembly of prisms projecting vertically from the floor surface 28, is able to represent the floor surface 28 without being shielded by the structure 321, 322 when it is desired to represent a state where the observation area 22 is overviewed from above. In other words, despite using the measurement data D of the observation area 22 from two three-dimensional sensors 12, the above-described three-dimensional data can be imaged as a single plan view as illustrated in FIG. 3B, in which the entire observation area 22 is captured as a bird's-eye view from a position at infinity vertically above the floor surface 28, rather than two perspective views as illustrated in FIG. 3A. The height information (i.e., the magnitude of the representative height H) of the respective objects OB may be added to the single image in an identifiable manner with use of color (brightness, saturation, hue), hatching, etc.

In the above-described three-dimensional data generation method in which the three-dimensional data of the observation area 22 is generated as the assembly of prisms each having the bottom face formed of the subdivision 38, the subdivision 381 corresponding to a part of the floor surface 28, which is a blind spot between the structure 322 and the structure 321, is not assigned with a representative height H and thus cannot be represented by a prism. However, the subdivision information preparing section 16 retains the information of position and dimensions in the reference plane 36 in connection with the subdivision 381, and therefore it is possible to generate the three-dimensional data in a state where the subdivision 381 is represented as a subdivision not having a representative height H (i.e., as a blind spot) and thus is distinguishable from the other subdivision 38 having the representative height H. For example, in the case where the monitoring system 20 is configured to automatically monitor the observation area 22 by using a computer, etc., based on the three-dimensional data generated by the three-dimensional data generation apparatus 10, it is possible to automatically and accurately recognize the subdivision 381 not having a representative height H as the blind spot based on the position and dimensions of the subdivision 381 in the reference plane 36. Also, in the case where the monitoring system 20 has a configuration in which the three-dimensional data generated by the three-dimensional data generation apparatus 10 is displayed as an image on a monitor screen and an observer monitors at any time the image, it is possible to display the subdivision 381 in a form (e.g., marked with "x" in FIG. 5) distinguishable from the other subdivisions 38 (i.e., the object OB), based on the position and dimensions of the subdivision 381 in the reference plane 36. As a result, the observer can visually and accurately recognize the subdivision 381 as the blind spot.

Furthermore, in the above-described three-dimensional data generation method in which the three-dimensional data of the observation area 22 is generated as the assembly of prisms each having the bottom face formed of the subdivision 38, two structures 321 and 322 located adjacent to each other in a radial direction about the optical axes 24b of the cameras 241 and 242 are represented by the assemblies of prisms each projecting vertically from the floor surface 28. Therefore, it is possible to substantially represent a distance between two structures 321, 322 by a prism representing the floor 30 located between the structures 321, 322. For example, in the case where the monitoring system 20 is configured to automatically monitor the observation area 22 by using a computer, etc., based on the three-dimensional data generated by the three-dimensional data generation apparatus 10, it is possible to automatically grasp the distance between the structures 321, 322 through relatively easy computation, based on the number, positions and dimensions of the subdivisions 38 between two structures 321, 322. Also, in the case where the monitoring system 20 has a configuration in which the three-dimensional data generated by the three-dimensional data generation apparatus 10 is displayed as an image on a monitor screen and an observer monitors at any time the image, it is possible to display the floor surface 28 (i.e., a space) between the structures 321, 322 based on the number, positions and dimensions of the subdivisions 38 between two structures 321, 322. As a result, the observer can readily grasp the distance between the structures 321, 322.

In the above-described three-dimensional data generation method, even in a configuration wherein only measurement data D from a single three-dimensional sensor 12 (i.e., a single camera 24) is used, the three-dimensional data of the observation area 22 can be analogously generated as an assembly of prisms each having a bottom face formed of each of the subdivisions 38. This configuration is likely to increase the number of blind spots each like the above-described subdivision 381, but can have effects analogous to those in the configuration using the measurement data D from two or more three-dimensional sensors 12. For example, assuming that only the measurement data D from the right-side camera 242 is used in the system configuration of FIG. 4, a blind spot like the subdivision 381 will be caused in a part of the floor surface 28, which is located farther away from the camera 242 than the larger structure 321. However, as described above, it is possible to generate the three-dimensional data in a state where each of subdivisions representing the blind spot is a subdivision not having a representative height H and thus is distinguishable from the other subdivision 38 having the representative height H. As a result, a computer, etc., can automatically and accurately recognize the blind spot, or an observer can visually and accurately recognize the blind spot from a display on a monitor screen. Also, even when only the measurement data D from the right-side camera 242 is used in the system configuration of FIG. 4, a distance between two structures 321 and 322 can be substantially represented by a prism representing the floor 30 located between the structures 321, 322, as described above. As a result, a computer, etc., can easily and automatically grasp the distance between two structures 321, 322, or an observer can easily grasp the distance between the structures 321, 322 from a display on a monitor screen.

Thus, according to the three-dimensional data generation apparatus 10 and the three-dimensional data generation method, the three-dimensional data prepared by representing the observation area 22 with use of a plurality of subdivisions 38 (i.e., prisms), each having the position and dimensions in the reference plane 36 and the representative height H, is generated based on the measurement data D from the three-dimensional sensor 12 that has measured the observation area 22. The three-dimensional data is generated in such a manner that a blind spot caused in the observation area 22 due to a positional relationship between the camera 24 of the three-dimensional sensor 12 and the object OB present in the observation area 22 is represented as a subdivision not having a representative height H and thus is distinguishable from the other subdivision 38 having the representative height H. Accordingly, the blind spot in the observation area 22 can be accurately recognized by referring to the generated three-dimensional data. Additionally, a distance between two objects OB present in the observation area 22 can be readily grasped based on the position and dimensions, in the reference plane 36, of the subdivision 38 present between the objects OB.

In addition to eliminating the blind spot by increasing the number of three-dimensional sensors 12 (or cameras 24), a residual blind spot can be represented in a form distinguishable from the object OB in a single image, and therefore, in the case where the three-dimensional data generation apparatus 10 is used in, for example, a monitoring system in which an observer monitors at any time the three-dimensional data displayed as an image on a monitor screen, it is not necessary for the observer to carry out a complicated monitoring operation such as comparing images corresponding to the plurality of cameras 24 and determining whether or not a blind spot is caused. Furthermore, the configuration wherein the three-dimensional data of the observation area 22 is generated by using the position and dimensions in the reference plane 36 and the representative height H, of each of the plurality of subdivisions 38 formed by uniformly dividing the reference plane 36, makes it possible, for the case where the three-dimensional data generation apparatus 10 is used in, for example, a monitoring system in which a computer, etc., automatically monitors the observation area 22 based on the three-dimensional data, to suppress an increase in the calculation amount for recognizing the object OB and the blind spot by combining the measurement data D from respective three-dimensional sensors 12 (or cameras 24), even when the number of three-dimensional sensors 12 is increased, and therefore, it is possible to prevent a drop in a processing speed.

According to the monitoring system 20, which includes the three-dimensional data generation apparatus 10, and it is possible to accurately recognize a blind spot in the observation area 22 and readily grasp a distance between objects OB. Additionally, even in the case where the number of three-dimensional sensors 12 (or cameras 24) is increased in order to eliminate a blind spot, it is possible to eliminate a complicated monitoring operation such that an observer compares images corresponding to the plurality of three-dimensional sensors 12 to determine whether or not the blind spot is caused, or it is possible to suppress an increase in the calculation amount for recognizing the object OB and the blind spot by combining the measurement data D from the respective three-dimensional sensors 12 and thereby to prevent a drop in a processing speed. Furthermore, using the three-dimensional data generated by the three-dimensional data generation apparatus 10 with the same period as a measurement period previously set in the three-dimensional sensors 12 relating to the observation area 22, makes it possible to continuously monitor the observation area 22 in real, time.

In the aforementioned three-dimensional data generation method, a single subdivision 38 may sometimes contain the X-Y coordinate values of a plurality of different measured coordinates M, when the subdivision information preparing section 16 of the three-dimensional data generation apparatus 10 specifies a subdivision 38, among the plurality of subdivisions 38 formed by uniformly dividing the reference plane 36, which contains the X-Y coordinate values of the measured coordinates M of the object OB. For example, in the three-dimensional data generation method illustrated in FIG. 4, the plurality of subdivisions 38 formed by uniformly dividing the reference plane 36 include, in addition to a subdivision 382 containing only single measured coordinates M, subdivisions 383 and 384 each containing a plurality of different measured coordinates M having an identical Z value (or substantially identical Z values involving measurement or arithmetic errors), as well as subdivisions 385 and 386 each containing a plurality of different measured coordinates M having distinctly different Z values. For the subdivision 383, 384 containing the plurality of different measured coordinates M having the identical Z value (or substantially identical Z values), it is allowed to assign the Z value common to the measured coordinates M (or the Z value arbitrarily selected from the substantially identical Z values) to the subdivision 383, 384 as the representative height H. On the other hand, for the subdivision 385, 386 containing the plurality of different measured coordinates M having the distinctly different Z values, it is necessary to appropriately select any one of the Z values of the measured coordinates M, which should be used as the representative height H.

Figure 6:
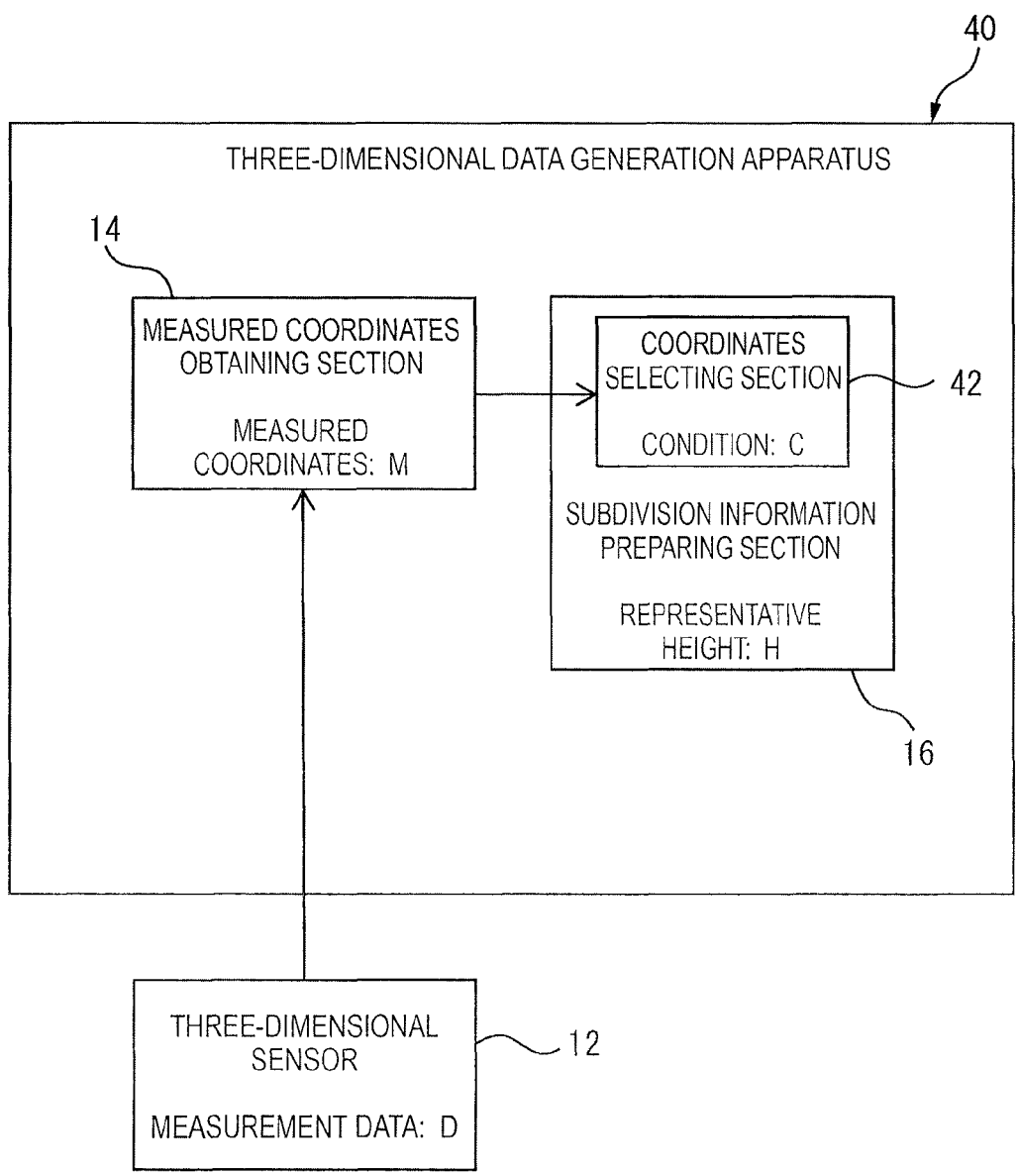
FIG. 6 is a functional block diagram illustrating a configuration example of a three-dimensional data generation apparatus.

FIG. 6 illustrates the configuration of a three-dimensional data generation apparatus 40 having a function of selecting single measured coordinates M from the plurality of measured coordinates M, for each of the plurality of subdivisions 38 formed by uniformly dividing the reference plane 36. The three-dimensional data generation apparatus 40 is one specific configuration example having the basic configuration of the aforementioned three-dimensional data generation apparatus 10, and corresponding components are denoted by the same reference numerals while detailed descriptions thereof are not repeated. The monitoring system 20 of FIG. 2 may also include the three-dimensional data generation apparatus 40 instead of the three-dimensional data generation apparatus 10.

The three-dimensional data generation apparatus 40 includes the measured coordinates obtaining section 14 and the subdivision information preparing section 16. The subdivision information preparing section 16 includes a coordinates selecting section 42 configured to, in a case where a single subdivision 38 contains the X-Y coordinate values of a plurality of measured coordinates M, selects single measured coordinates M from the plurality of measured coordinates M in accordance with a predetermined condition C. The subdivision information preparing section 16 assigns a Z value of the measured coordinates M selected by the coordinates selecting section 42 as the representative height H to the subdivision 38 containing the X-Y coordinate values of the same measured coordinates M. The condition C is previously determined so as to make it possible to, when the measured coordinates M satisfying the condition C are selected from among the plurality of measured coordinates M involved in a single subdivision 38, further approximate the shape of the three-dimensional data of the object OB represented by the aforementioned prism assembly to the actual shape of the object OB, as compared to a case where other measured coordinates M are selected.

For example, the coordinates selecting section 42 may be configured to select the measured coordinates M having, as the condition C, a distance L that is the shortest to the camera 24 of the three-dimensional sensor 12, from among the plurality of measured coordinates M, of which the X-Y coordinate values are contained in the single subdivision 38. For example, in the three-dimensional data generation method illustrated in FIG. 4, a plurality of image-capturing points M1 captured by the camera 241 line up vertically along the left side surface of the structure 321, and two image-capturing points M1 (M1-1 and M1-2) captured by the camera 241 and two image-capturing points M2 (M2-1 and M2-2) captured by the camera 242 are line up horizontally along the top surface of the structure 321 near the left end thereof, these image-capturing points M1 and M2 existing in a spatial range corresponding to the subdivision 385. The measured coordinates obtaining section 14 obtains the respective measured coordinates M of all of the image-capturing points M1 and M2 corresponding to the subdivision 385. The coordinates selecting section 42 selects the measured coordinates M corresponding to the image-capturing point M1 or M2 having a distance L that is the shortest to the camera 241 or 242, from among the obtained measured coordinates M. In the example of FIG. 4, a distance L between the camera 242 and the right-side image-capturing point M2-2 existing near the left end of the top surface of the structure 321 is the shortest, among distances L between all of the image-capturing points M1 and M2 corresponding to the subdivision 385 and the cameras 241 and 242. Accordingly, the coordinates selecting section 42 selects the measured coordinates M corresponding to the right image-capturing point M2-2 near the left end of the top surface of the structure 321 captured by the camera 242, and the subdivision information preparing section 16 assigns the Z value of the selected measured coordinates M to the subdivision 385 as the representative height H.

Figure 7:
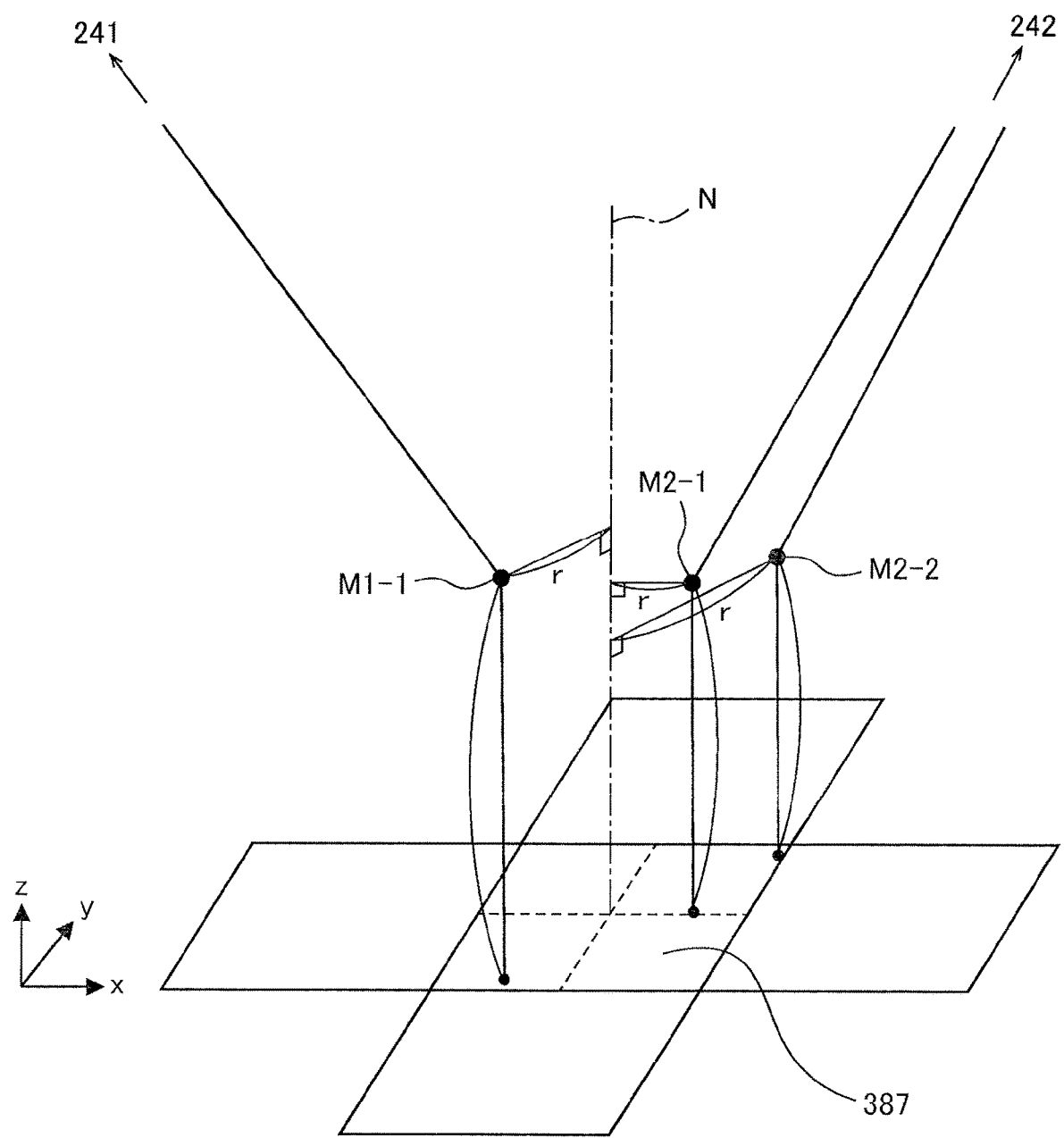
FIG. 7 is a diagram conceptually illustrating an example of a coordinates selecting condition in the three-dimensional data generation apparatus of FIG. 6.

Alternatively, the coordinates selecting section 42 may be configured to select the measured coordinates M having, as the condition C, a distance r that is the shortest to a center point of the single subdivision, from among the plurality of measured coordinates M, of which the X-Y coordinate values are contained in the single subdivision 38. For example, FIG. 7 illustrates a state in which three image-capturing points M1-1, M2-1 and M2-2 having different coordinate values exist in a spatial range corresponding to a single subdivision 387. In this state, the image-capturing point M2-1 captured by the camera 242 is the image-capturing point having a distance r shortest to the center point (more accurately, a normal line N passing through the center point) of the subdivision 387. Accordingly, the coordinates selecting section 42 selects the measured coordinates M corresponding to the image-capturing point M2-1 captured by the camera 242, and the subdivision information preparing section 16 assigns the Z value of the selected measured coordinates M to the subdivision 387 as the representative height H.

The coordinates selecting section 42 may select the measured coordinates M by using a single condition C previously chosen by a system designer from a plurality of conditions C including the above-described two conditions C in view of the situation of the observation area 22, the required precision of the three-dimensional data, etc.

Figure 8:
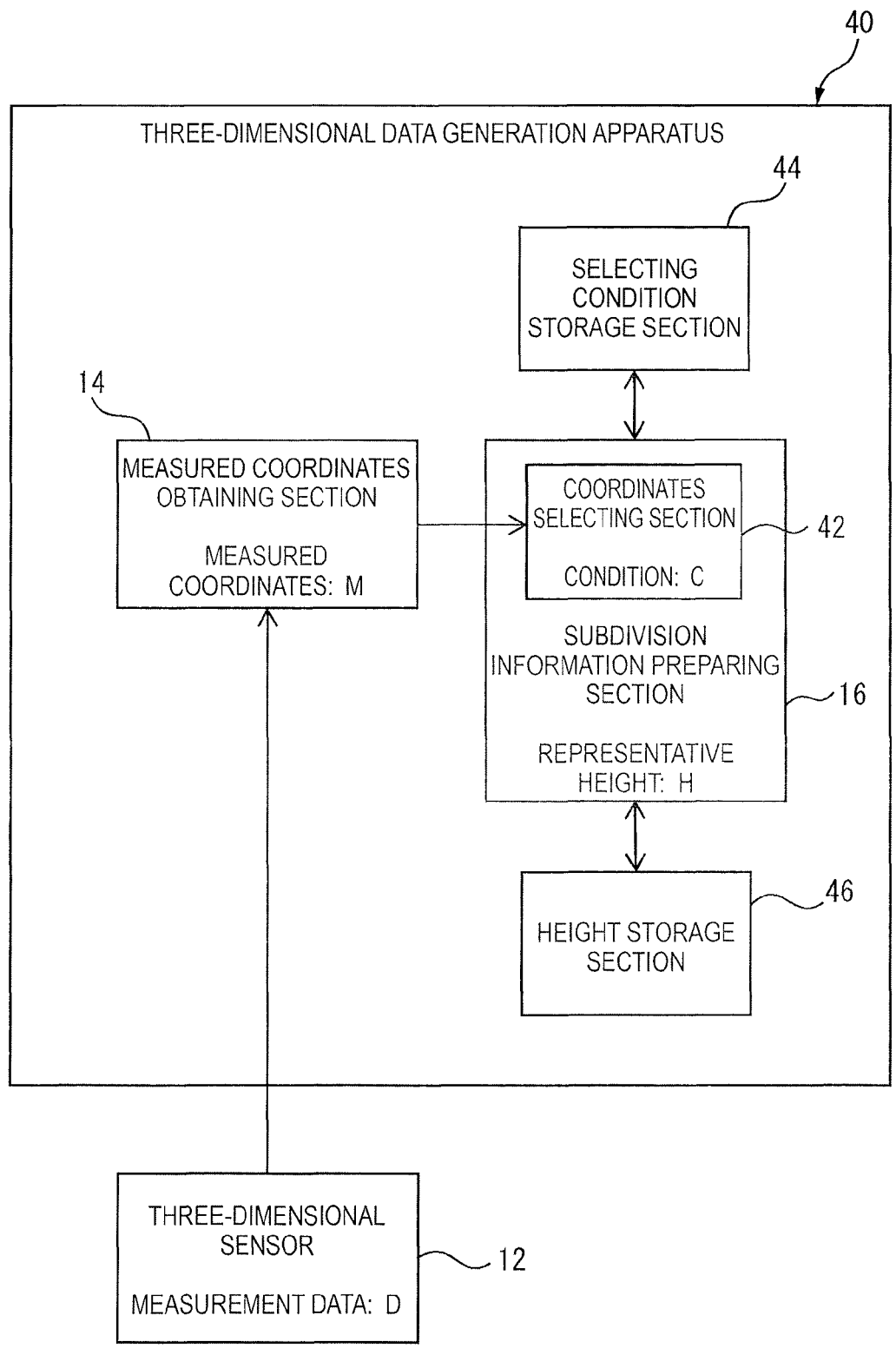
FIG. 8 is a functional block diagram illustrating another configuration example of a three-dimensional data generation apparatus.

As illustrated in FIG. 8, the three-dimensional data generation apparatus 40 according to another configuration example may further include a selecting condition storage section 44 configured to store, for each of the plurality of subdivisions 38, the distance L or r from each of the plurality of measured coordinates M (or the image-capturing points M1 or M2), of which the X-Y coordinate values are contained in each subdivision, to the camera 24 or the subdivision center-point (or the normal line N). When the subdivision information preparing section 16 specifies a subdivision 38 that contains the X-Y coordinate values of the measured coordinates M of the objects OB, among the plurality of subdivisions 38 formed by uniformly dividing the reference plane 36, the coordinates selecting section 42 operates, every time it calculates the distance L or r of the measured coordinates M (the image-capturing points M1 or M2) for each subdivision 38, to refer to a storage region provided for each subdivision 38 in the selecting condition storage section 44 and, if a distance L or r is not stored in the storage region, to store a newly-calculated distance L or r in the storage region. Further, when the coordinates selecting section 42 refers to a storage region provided for each subdivision 38 and if a distance L or r of other measured coordinates M is stored in the storage region, the coordinates selecting section 42 operates to compare the stored distance L or r with a newly-calculated distance L or r of the measured coordinates M and, if the new distance L or r is shorter, to update the storage region with the new distance L or r (i.e., rewrite the stored distance L or r to the new distance L or r). The subdivision information preparing section 16 assigns to each subdivision 38 the Z value of the measured coordinates M having the latest distance L or r stored in the selecting condition storage section 44 as the representative height H.

The three-dimensional data generation apparatus 40 may repeatedly carry out a data generation operation over an arbitrary period of time, the data generation operation including the obtaining of the measured coordinates M executed by the measured coordinates obtaining section 14 and the assigning of the representative height H executed by the subdivision information preparing section 16, by using the measurement data from the three-dimensional sensor 12 that continuously measures the observation area 22 (FIG. 2) over an arbitrary period of time. In this connection, a single data generation operation is defined, in a configuration where the measurement data from a single three-dimensional sensor 12 (or a camera 24) is used, as a single-cycle processing (i.e., a process for obtaining the measured coordinates M and a process for assigning the representative height H to the subdivision 38) consecutively executed on the position information of the object OB acquired by all of the light-receiving elements of the single camera 24, while in a configuration where the measurement data from a plurality of three-dimensional sensors 12 (or cameras 24) are used, as a single-cycle processing (i.e., a process for obtaining the measured coordinates M and a process for assigning the representative height H to the subdivision 38) consecutively executed on the position information of the object OB acquired by all of the light-receiving elements of all of the cameras 24.

In the case where the three-dimensional data generation apparatus 40 including the selecting condition storage section 44 repeatedly performs the above-described data generation operation, the subdivision information preparing section 16 may be configured to place all of the storage regions provided for the respective subdivisions 38 in the selecting condition storage section 44 into a nullified state, when a single data generation operation has finished (i.e., when the selection of the measured coordinates M has been entirely performed through the subdivisions 38 requiring the selection of measured coordinates M). In this connection, "nullified state" means a state in which no data is stored in the storage region, or a state in which data exhibiting invalidity (e.g., data exhibiting a special value such as infinity) is stored in the storage region.

Placing all of the storage regions in the selecting condition storage section 44 into the nullified state, each time a single data generation operation has finished, makes it possible for the subdivision information preparing section 16 (or the coordinates selecting section 42) to newly select the measured coordinates M for each subdivision 38 in each data generation operation, regardless of the result of selecting the measured coordinates M for each subdivision 38 in the last data-generation operation. Thus, even in a situation where an object OB is moving or a new object OB has appeared in the observation area 22, the subdivision information preparing section 16 can assign a new representative height H to each subdivision 38 in each data generation operation, so as to follow the movement or appearance of the object OB. Instead of the point in time when a single data generation operation has finished, a period previously set to be equal to or longer than a time required to complete the single data generation operation may be used as a time point when the storage region in the selecting condition storage section 44 is placed into the nullified state.

As illustrated in FIG. 8, the three-dimensional data generation apparatus 40 according to another configuration example may further include a height storage section 46 configured to store the representative height H for each of the plurality of subdivisions 38, in addition to or instead of the selecting condition storage section 44. When the subdivision information preparing section 16 specifies a subdivision 38 that contains the X-Y coordinate values of the measured coordinates M of the objects OB, among the plurality of subdivisions 38 formed by uniformly dividing the reference plane 36, the subdivision information preparing section 16 operates, every time it determines the Z value (i.e., the representative height H) of the measured coordinates M (the image-capturing points M1 or M2) for each subdivision 38, to store the determined representative height H in a storage region provided for each subdivision 38 in the height storage section 46. Note that the aforementioned three-dimensional data generation apparatus 10 may also include the height storage section 46 (i.e., regardless of whether or not the coordinates selecting section 42 is provided).

In a configuration wherein the three-dimensional data generation apparatus 40 including the height storage section 46 repeatedly performs the aforementioned data generation operation over an arbitrary period of time, the subdivision information preparing section 16 operates, every time it determines the representative height H for each subdivision 38 in each data generation operation, to refer to a storage region provided for the subdivision 38 in the height storage section 46. If the referred-to storage region is in a nullified state, the subdivision information preparing section 16 stores a newly-determined representative height H in the storage region. On the other hand, if the other representative height H is stored in the referred-to storage region, the subdivision information preparing section 16 updates the storage region with the newly-determined representative height H (i.e., rewrite the stored representative height H to the new representative height H). The subdivision information preparing section 16 assigns, in each data generation operation, the latest representative height H stored in the height storage section 46 to each subdivision 38.

Furthermore, the subdivision information preparing section 16 may be configured, each time a subdivision 38 not assigned with a representative height H is found in each data generation operation, to place a storage region provided for the unassigned subdivision 38 in the height storage section 46 into a nullified state. Placing the storage region into the nullified state, each time a subdivision 38 not assigned with the representative height H is found, makes it possible for the three-dimensional data generation apparatus 40, in a situation where, e.g., an object OB is moving or a new object OB has appeared in the observation area 22, to generate the three-dimensional data accurately representing a blind spot newly caused to follow the movement or appearance of the object OB. In a configuration where the three-dimensional data generation apparatus 40 includes both of the selecting condition storage section 44 and the height storage section 46, the subdivision information preparing section 16 may operate to check, at an instant, e.g., when a single data generation operation has finished, whether or not a storage region in a nullified state has already existed in the selecting condition storage section 44, prior to the aforementioned operation to place the storage region in the selecting condition storage section 44 into a nullified state, and if a storage region in a nullified state has already existed (i.e., a subdivision 38 not assigned with the representative height H is existing), to place a storage region in the height storage section 46 for the subdivision 38 corresponding to the storage region in the selecting condition storage section 44 into a nullified state.

One example may have a configuration in which the plurality of subdivisions 38 are provided with numbers for making the subdivisions 38 identifiable and the plurality of storage regions in the height storage section 46 are provided with addresses using numbers identical to those of the corresponding subdivisions 38, and thereby the representative heights H assigned to the respective subdivisions 38 are stored in the storage regions having the corresponding addresses. This example has an advantage in facilitating a processing of calculating a shape of each object OB or a distance between objects OB from the generated three-dimensional data, or imaging the generated three-dimensional data.

According to the above-described three-dimensional data generation apparatus 40 including the coordinates selecting section 42, it is possible to approximate the shape (in particular, the contour and height information, in a plan view overviewed from infinity vertically above) of the three-dimensional data of the object OB generated by the three-dimensional data generation apparatus 40 to the actual shape of the object OB.

Figure 9:
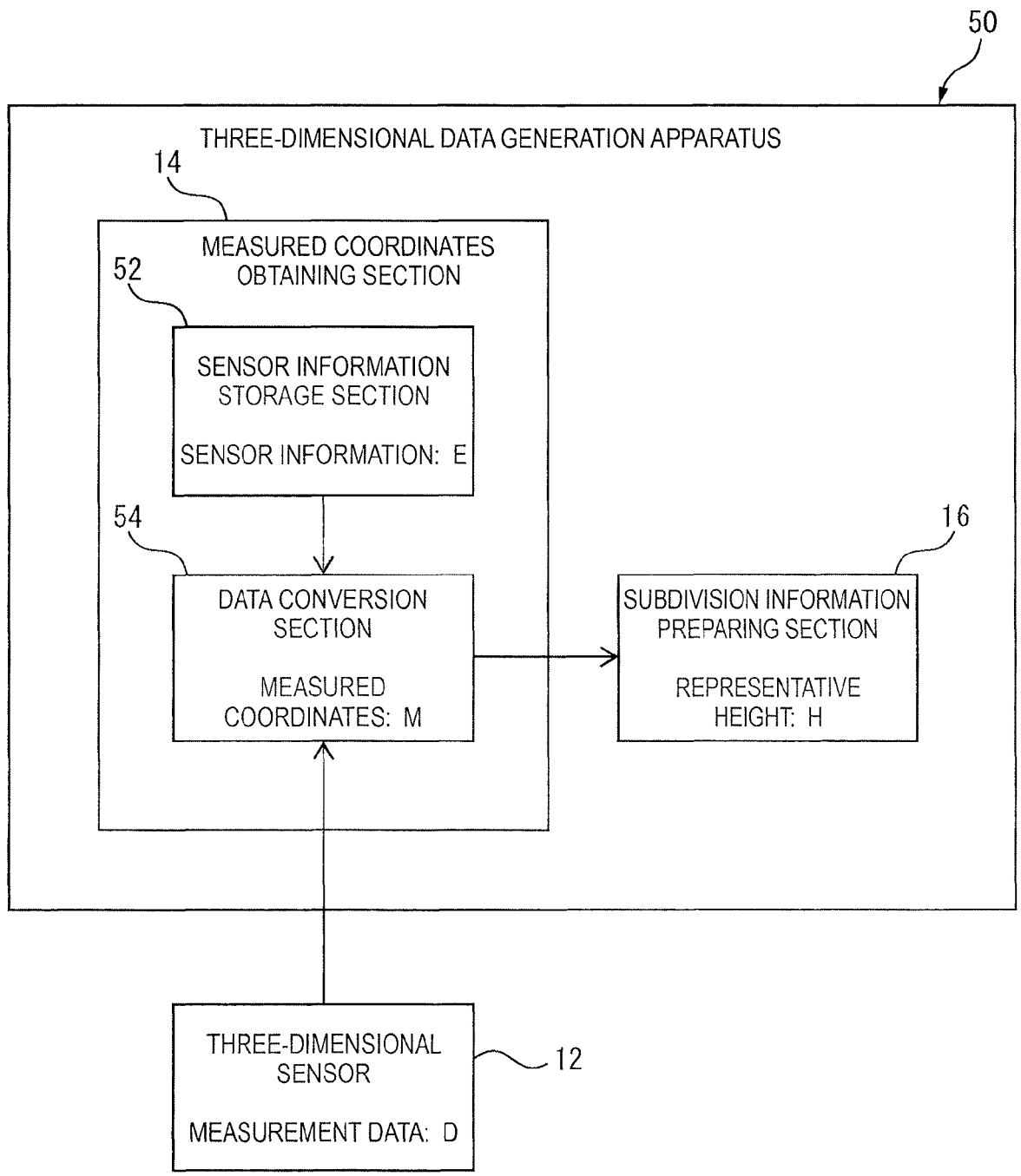
FIG. 9 is a functional block diagram illustrating yet another configuration example of a three-dimensional data generation apparatus.

FIG. 9 illustrates the configuration of a three-dimensional data generation apparatus 50 having a function in which the measured coordinates obtaining section 14 obtains the measured coordinates M by executing arithmetic processing, such as coordinate conversion, on the measurement data D from the three-dimensional sensor 12. The three-dimensional data generation apparatus 50 is another specific configuration example having the basic configuration of the aforementioned three-dimensional data generation apparatus 10, and corresponding components are denoted by the same reference numerals while detailed descriptions thereof are not repeated. The aforementioned three-dimensional data generation apparatus 40 may be provided with a data conversion function analogous to that of the three-dimensional data generation apparatus 50. The monitoring system 20 of FIG. 2 may also include the three-dimensional data generation apparatus 50 instead of the three-dimensional data generation apparatus 10.

The three-dimensional data generation apparatus 50 includes the measured coordinates obtaining section 14 and the subdivision information preparing section 16. The measured coordinates obtaining section 14 includes a sensor information storage section 52 configured to previously store sensor information E including a position and image capturing direction of the camera 24 of the three-dimensional sensor 12 in the three-axis rectangular coordinate system 34 (FIG. 2), and a data conversion section 54 configured to convert the measurement data D from the three-dimensional sensor 12 into the measured coordinates M in the three-axis rectangular coordinate system 34 based on the sensor information E stored in the sensor information storage section 52. The position of the camera 24 as one of the sensor information E is a parameter determined when the monitoring system 20 (FIG. 2) is constructed, and represents the position relationship of the camera 24 with respect to the observation area 22 in the three-axis rectangular coordinate system 34. The image capturing direction of the camera 24 as another sensor information E is a parameter determined when the monitoring system 20 is constructed, and represents the orientation relationship (i.e., the direction of an optical axis) of the camera 24 with respect to the observation area 22 in the three-axis rectangular coordinate system 34. While a data conversion procedure carried out by the measured coordinates obtaining section 14 differs depending on the type of the three-dimensional sensor 12, one example of a data conversion procedure in the case where a TOF (Time of Flight) camera is used as the three-dimensional sensor 12 will be described below with reference to FIGS. 10 to 13.

Figure 10:
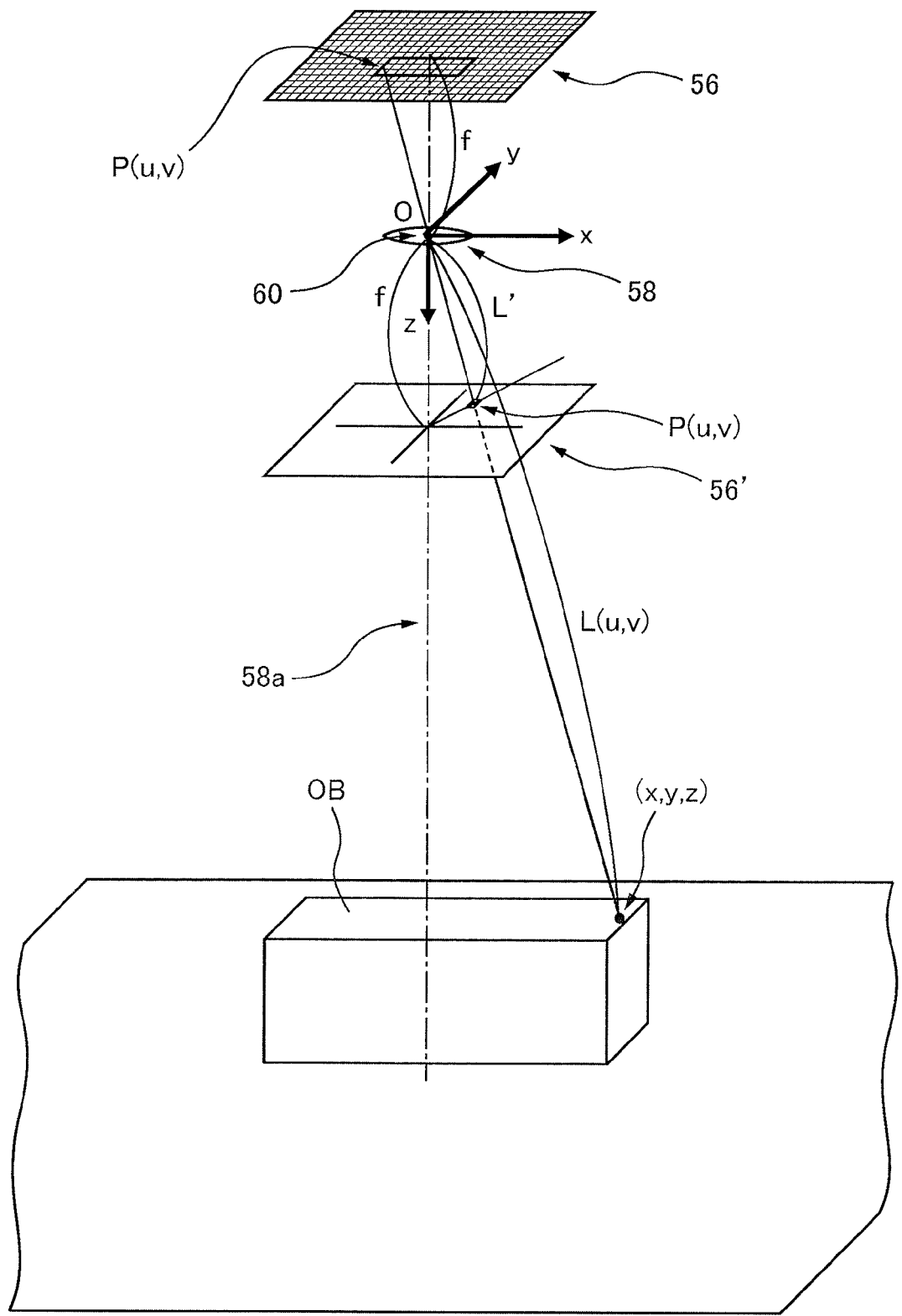
FIG. 10 is a diagram for explaining a data conversion process in the three-dimensional data generation apparatus of FIG. 9.

FIG. 10 schematically illustrates the structure of an image capturing section (equivalent to the camera 24) of a typical TOF camera, as well as the relationship between the image capturing section and a subject. The image capturing section of the TOF camera includes a sensor chip 56 and a lens 58 as primary components. The sensor chip 56 can acquire the distance L from each of a plurality of light-receiving elements to the subject as position information (raw data) of an image-capturing point. A typical TOF camera is previously adjusted in such a manner that a distance between the sensor chip 56 and a center point (optical center) O of the lens 58 is equal to a focal length f of the lens 58, and an optical axis 58a of the lens 58 passes orthogonally through the center point of the sensor chip 56.

Figure 11A:
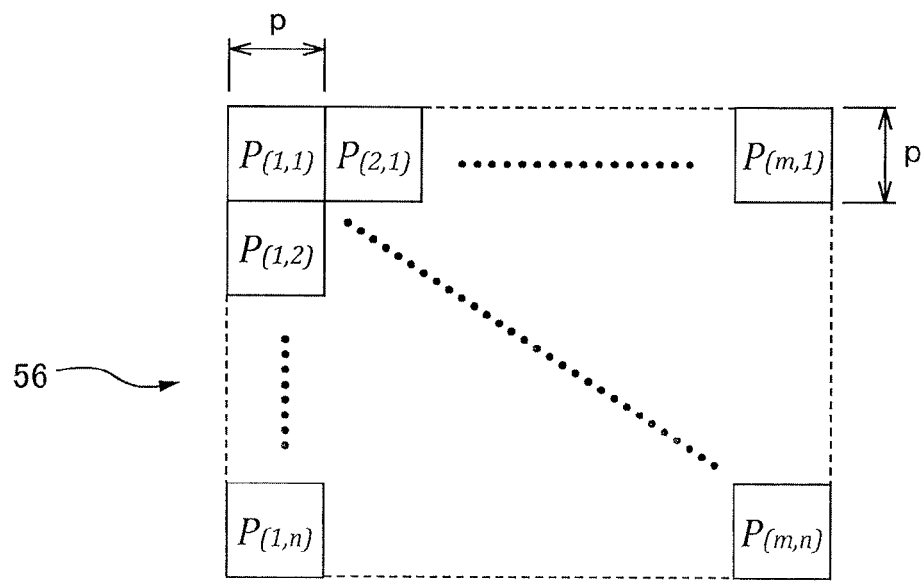
FIG. 11A is a diagram for explaining a data conversion process in the three-dimensional data generation apparatus of FIG. 9.
Figure 11B:
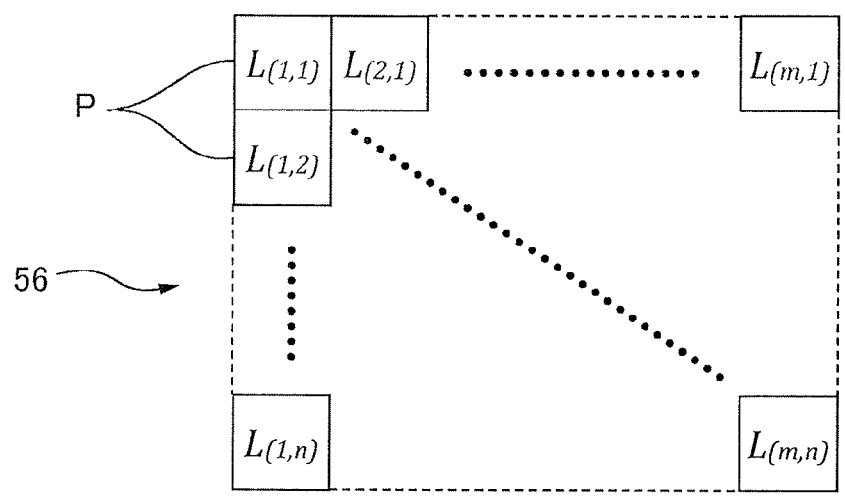
FIG. 11B is a diagram for explaining a data conversion process in the three-dimensional data generation apparatus of FIG. 9.

FIGS. 11A and 11B schematically illustrate the structure of the sensor chip 56. The sensor chip 56 typically has a plurality of light-receiving elements (or pixels) P arranged in a square grid, each pixel having a side length (or pitch) p. In the illustrated example, the sensor chip 56 is constituted of light-receiving elements P(1, 1) to P(m, n), i.e., the "m" elements in each horizontal row and the "n" elements in each vertical row (FIG. 11A). The respective light-receiving elements P can acquire distances L(1, 1) to L(m, n) to the image-capturing points on the subject captured by the corresponding light-receiving elements P (FIG. 11B). The distance L is typically acquired as data in a polar coordinate system. The focal length f, the numbers of pixels m and n, and the pixel pitch p are parameters determined depending on the specifications of the TOF camera.

First, a procedure for converting the position information (or the distance L) of each image-capturing point on the subject captured by the TOF camera into coordinate values in a local three-axis rectangular coordinate system set in the TOF camera (hereinafter referred to as a "local coordinate system") will be described. The data conversion procedure in this example is an arithmetic processing executed by the data conversion section 54 (FIG. 9) if the position information of the image-capturing point (i.e., raw data) is used as the measurement data D from the three-dimensional sensor 12, or alternatively, is an arithmetic processing executed by the camera controller 26 (FIG. 2) if data acquired through the said arithmetic processing executed on the position information (i.e., raw data) is used as the measurement data D from the three-dime For a better understanding, a virtual sensor chip 56' is supplementarily depicted in FIG. 10, which is spaced apart from the lens 58 by the same focal length f on the opposite side (or subject side) of the lens 58 from the sensor chip 56. FIG. 10 illustrates a local coordinate system 60 of the TOF camera, of which the origin is located at the optical center O and the x axis, y axis and z axis are oriented in illustrated directions. Furthermore, FIG. 10 illustrates a situation in which a single light-receiving element P(u, v) of the sensor chip 56 captures an image-capturing point (x, y, z) (coordinate values in the local coordinate system 60) on the object OB that is the subject.

Figure 12:
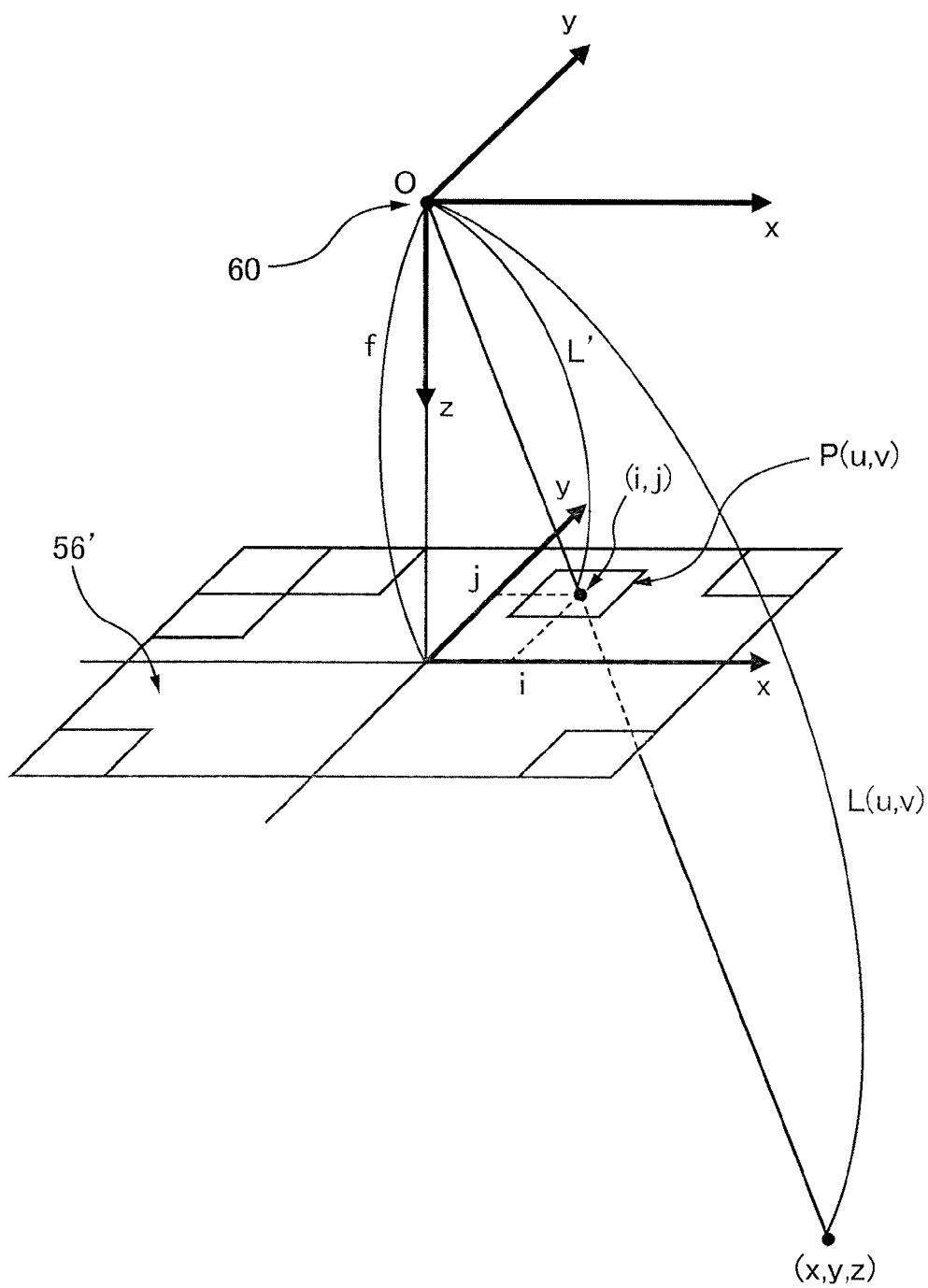
FIG. 12 is a diagram illustrating a part of FIG. 10 in an enlarged manner.

FIG. 12 schematically illustrates a single light-receiving element P(u, v) in the virtual sensor chip 56' in an enlarged manner for a better understanding. Although the light-receiving element P has a predetermined area, the image capturing is substantially performed at a central part of the light-receiving element P, and thus a center position (i, j) of the light-receiving element P(u, v) in the virtual sensor chip 56' is determined as a point for measuring the distance L. As can be seen from FIGS. 11A and 12, the center position (i, j) of each light-receiving element P(u, v) is expressed in the following Formula 1.

$$i = p \times \left(u - \frac{m+1}{2}\right), \quad j = p \times \left(v - \frac{n+1}{2}\right) \quad u = 1, 2, 3, \ldots, m \quad v = 1, 2, 3, \ldots, n \qquad \text{Formula 1}$$

A distance L' from the optical center O to the center position (i, j) of the light-receiving element P(u, v) is expressed in the following Formula 2.

$$L' \sqrt{f^2 + i^2 + j^2} \qquad \text{Formula 2}$$

Formula 3 expressing a proportional relationship is obtained based on a relationship of similarity.

$$L(u,v):L'=z:f=x:i=y:j \qquad \text{Formula 3}$$

Accordingly, the coordinate values (x, y, z) of the image-capturing point on the object OB are calculated through the following Formulas 4 to 6.

$$z = L(u, v) \times \frac{f}{\sqrt{f^2 + i^2 + j^2}} \qquad \text{Formula 4}$$

$$x = L(u, v) \times \frac{i}{\sqrt{f^2 + i^2 + j^2}} \qquad \text{Formula 5}$$

$$y = L(u, v) \times \frac{j}{\sqrt{f^2 + i^2 + j^2}} \qquad \text{Formula 6}$$

As can be seen from Formulas 4 to 6, the term other than L(u, v) is a constant determined by the specifications of the TOF camera and the position of each light-receiving element P(u, v). Thus, when converting the position information L(u, v) of each image-capturing point into coordinate values (x, y, z) in the local coordinate system 60, it is possible, for example, to previously calculate and store constant term for each light-receiving element P and determine the coordinate values by multiplying the constant term by L(u, v).

Figure 13:
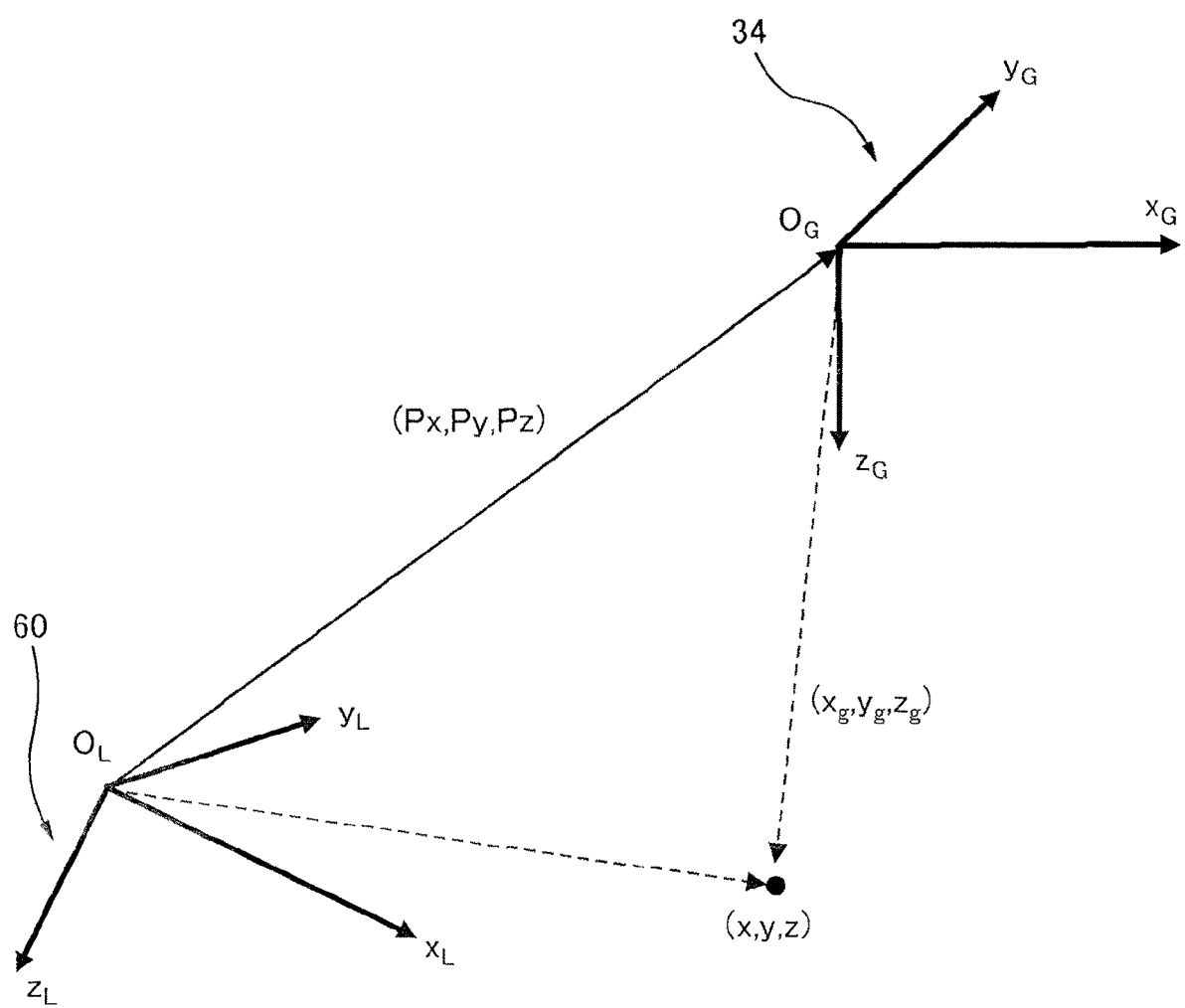
FIG. 13 is a diagram for explaining a data conversion process in the three-dimensional data generation apparatus of FIG. 9.

Next, a procedure for converting the coordinate values (x, y, z) in the local coordinate system 60 into coordinate values ($x_g$, $y_g$, $z_g$) (i.e., measured coordinates M) in the three-axis rectangular coordinate system (or global coordinate system) 34 (this is an operation executed by the data conversion section 54) will be described. FIG. 13 illustrates a relationship between the local coordinate system and the three-axis rectangular coordinate system 34. FIG. 13 illustrates, for identification, the local coordinate system 60 by using an origin $O_L$ and the respective axes $x_L$, $y_L$ and $z_L$, and the three-axis rectangular coordinate system (or global coordinate system) 34 by using an origin $O_G$ and the respective axes $x_G$, $y_G$ and $z_G$.

A relationship between the local coordinate system 60 and the three-axis rectangular coordinate system 34 can typically be expressed by a rotational component between the corresponding axes and a translational component between the origins. The relationship is expressed in the following Formula 7.

$$\begin{pmatrix} x \\ y \\ z \end{pmatrix} = R \begin{pmatrix} x_g \\ y_g \\ z_g \end{pmatrix} + T \qquad \text{Formula 7}$$

R and T represent a rotation matrix and a translation vector, respectively, as follows:

$$R = \begin{pmatrix} r_{11} & r_{12} & r_{13} \\ r_{21} & r_{22} & r_{23} \\ r_{31} & r_{32} & r_{33} \end{pmatrix} \quad T = \begin{pmatrix} Px \\ Py \\ Pz \end{pmatrix}$$

Each component (or parameter) of the rotation matrix R as well as the translation vector T are determined based on data of the position and image capturing direction of the image capturing section (or camera 24) of the TOF camera, included in the sensor information E stored in the sensor information storage section 52. The data conversion section 54 converts, by using the rotation matrix R and the translation vector T, the coordinate values (x, y, z) in the local coordinate system 60 into the coordinate values ($x_g$, $y_g$, $z_g$) (i.e., measured coordinates M) in the three-axis rectangular coordinate system 34 as expressed in the following Formula 8. Consequently, the conversion from the measurement data D measured by a single light-receiving element P into the measured coordinates M is completed.

$$\begin{pmatrix} x_g \\ y_g \\ z_g \end{pmatrix} = R^{-1} \left( \begin{pmatrix} x \\ y \\ z \end{pmatrix} - T \right) \qquad \text{Formula 8}$$

According to the above-described three-dimensional data generation apparatus 50 including the data conversion section 54, it is possible to properly obtain the measured coordinates M from the measurement data D in accordance with the type of the three-dimensional sensor 12.

Figure 14:
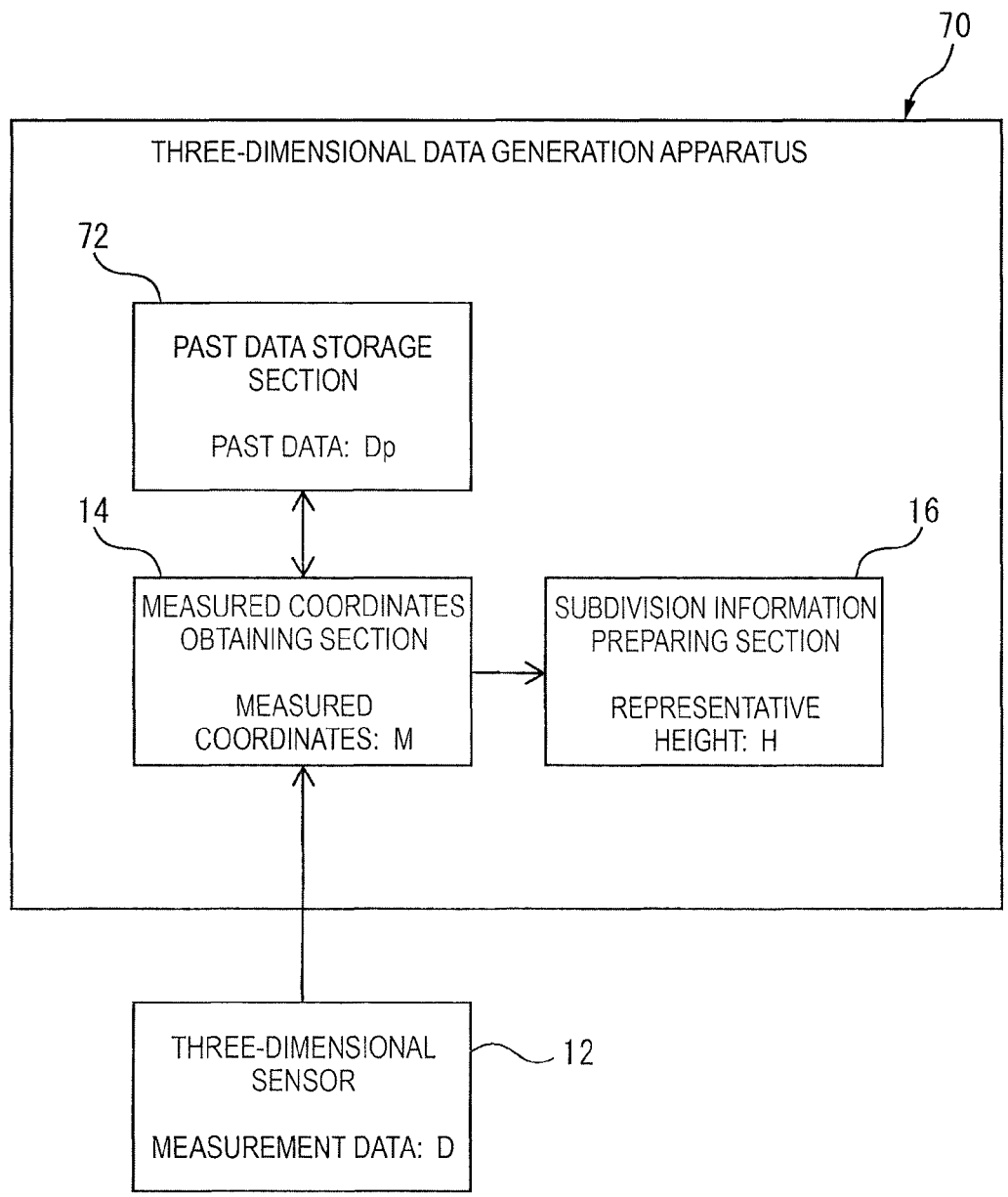
FIG. 14 is a functional block diagram illustrating yet another configuration example of a three-dimensional data generation apparatus.

FIG. 14 illustrates the configuration of a three-dimensional data generation apparatus 70 having a function in which the measured coordinates obtaining section 14 continuously watches the measurement data D from the three-dimensional sensor 12 over an arbitrary period of time and, when a change in the measurement data D is confirmed, obtains the measured coordinates M based on the changed measurement data D. The three-dimensional data generation apparatus 70 is yet another specific configuration example having the basic configuration of the aforementioned three-dimensional data generation apparatus 10, and corresponding components are denoted by the same reference numerals while detailed descriptions thereof are not repeated. The aforementioned three-dimensional data generation apparatus 40, 50 may be provided with a measurement data watching function analogous to that of the three-dimensional data generation apparatus 70. The monitoring system 20 of FIG. 2 may also include the three-dimensional data generation apparatus 70 instead of the three-dimensional data generation apparatus 10.

The three-dimensional data generation apparatus 70 has a configuration so as to repeatedly carry out a data generation operation over an arbitrary period of time, the data generation operation including the obtaining of the measured coordinates M executed by the measured coordinates obtaining section 14 and the assigning of the representative height H executed by the subdivision information preparing section 16, by using the measurement data from the three-dimensional sensor 12 that continuously measures the observation area 22 (FIG. 2) over an arbitrary period of time. The three-dimensional data generation apparatus 70 includes, in addition to the measured coordinates obtaining section 14 and the subdivision information preparing section 16, a past data storage section 72 configured to store the measurement data D from the three-dimensional sensor 12 as past data Dp. The measured coordinates obtaining section 14 operates, when it obtains the measured coordinates M of the object OB in the three-axis rectangular coordinate system 34 based on the measurement data D from the three-dimensional sensor 12 in each data generation operation, and each time a current measurement data D is outputted from each of the light-receiving elements of the camera 24 of the three-dimensional sensor 12, to refer to a storage region provided for each light-receiving element in the past data storage section 72. If a storage region corresponding to a light-receiving element generating current measurement data D is in a nullified state, the measured coordinates obtaining section 14 obtains the measured coordinates M based on the current measurement data D of the light-receiving element, and stores the current measurement data D in the corresponding storage region.

On the other hand, if past data Dp is stored in a storage region corresponding to a light-receiving element generating current measurement data D, the measured coordinates obtaining section 14 compares the current measurement data D of the light-receiving element with the past data Dp and, when the current measurement data D has changed from the past data Dp, obtains the measured coordinates M based on the current measurement data D and updates the corresponding storage region in the past data storage section 72 with the current measurement data D (i.e., stores the current measurement data D as new past data Dp). The subdivision information preparing section 16 assigns, to a subdivision 38 containing the X-Y coordinate values of the measured coordinates M obtained based on the current measurement data D, a Z value of the same measured coordinates M as the representative height H. When the current measurement data D of the light-receiving element is compared with the past data Dp and the current measurement data D has not changed from the past data Dp, the measured coordinates obtaining section 14 does not perform an obtainment of the measured coordinates M in connection with the said light-receiving element. The above configuration may be modified in such a manner that, in the step of comparing the current measurement data D with the past data Dp, a permissible value of a variation is previously set in consideration of dimensions of the object OB to be measured, a measurement or arithmetic error, a required precision of the three-dimensional data, etc., and if the current measurement data D has changed from the past data Dp beyond the permissible value, the above-described procedure is carried out based on the current measurement data D.

When the three-dimensional sensor 12 measures the observation area 22 for the first time in a previously set measurement period, all of the storage regions in the past data storage section 72 are in the nullified state, and therefore, the measured coordinates obtaining section 14 obtains the measured coordinates M based on the current measurement data D generated by all the light-receiving elements of the camera 24, and stores the measurement data D in the corresponding storage regions. The subdivision information preparing section 16 assigns the representative height H to each subdivision 38 by using the measured coordinates M obtained based on the current measurement data D, and processes the subdivision 38 not containing X-Y coordinate values of the measured coordinates M (e.g., the subdivision 381 in FIG. 4) as a blind spot. On or after the next measurement period, only in the case where an object OB has moved or a new object OB has appeared in the observation area 22 during a single measurement period (i.e., the case where the current measurement data D of each light-receiving element has changed from the past data Dp), the measured coordinates obtaining section 14 obtains the measured coordinates M of an object OB that has moved or appeared, based on the current measurement data D. The subdivision information preparing section 16 assigns a representative height H to only the subdivision 38, the state of which has changed due to the movement or appearance of the object OB, or processes only the said subdivision 38 as a blind spot, by using the measured coordinates M obtained based on the current measurement data D. Thus, in the three-dimensional data generation apparatus 70, when an object OB has moved or a new object OB has appeared in the observation area 22, the three-dimensional data is generated only for the subdivision 38, the state of which has changed accordingly, and therefore, it is possible to reduce a calculation amount and increase a processing speed in relation to the generation of the three-dimensional data.

Figure 15:
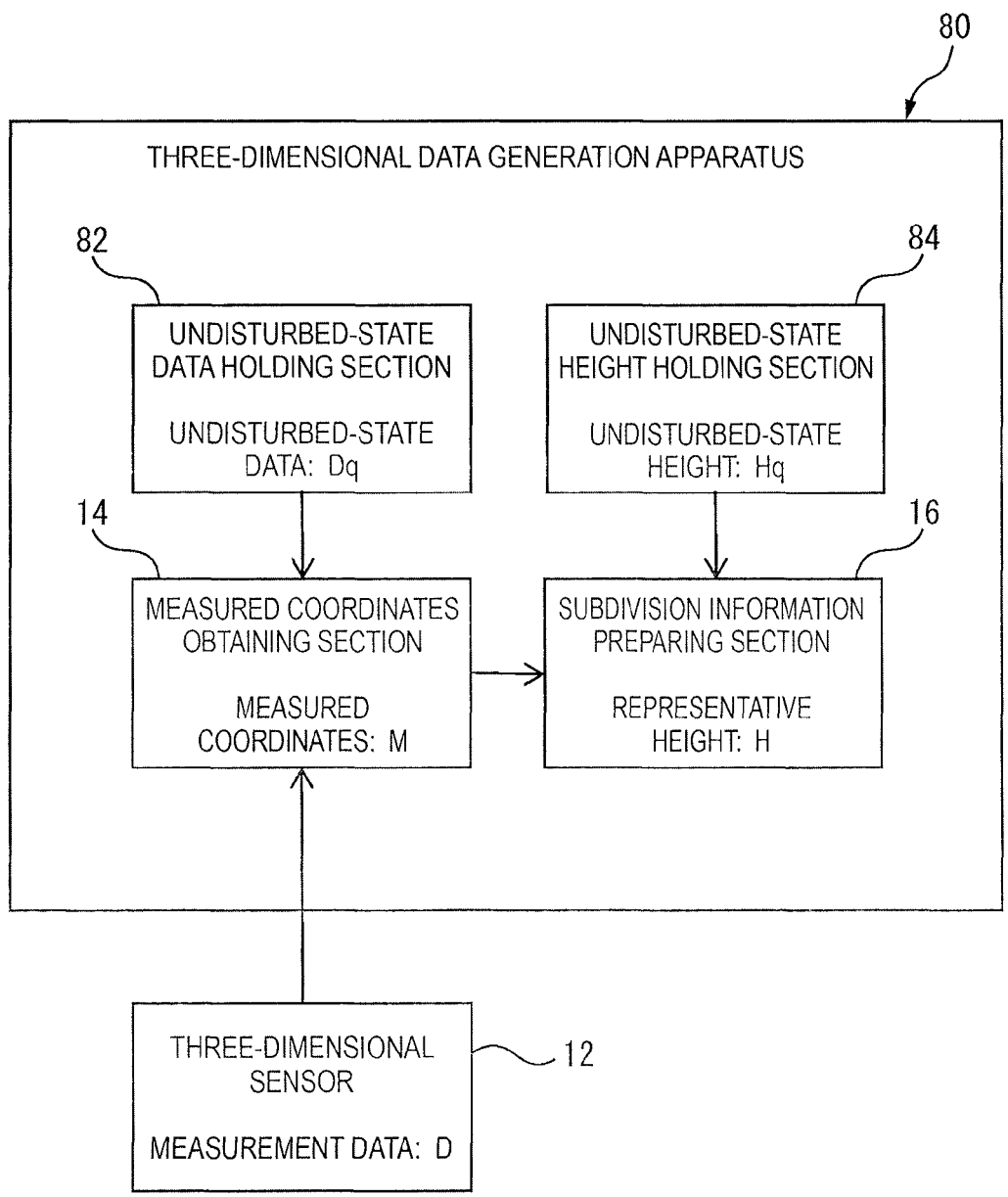
FIG. 15 is a functional block diagram illustrating yet another configuration example of a three-dimensional data generation apparatus.

FIG. 15 illustrates the configuration of a three-dimensional data generation apparatus 80 having a function in which the measured coordinates obtaining section 14 continuously watches the measurement data D from the three-dimensional sensor 12 over an arbitrary period of time and, when current measurement data D has changed from measurement data D acquired when only an object OB continuously immovable at a predetermined position is present in the observation area 22 (FIG. 2) hereinafter referred to as an undisturbed state), uses the measured coordinates M of the object OB in the undisturbed state to generate the three-dimensional data of the current observation area 22. The three-dimensional data generation apparatus 80 is a further specific configuration example having the basic configuration of the aforementioned three-dimensional data generation apparatus 10, and corresponding components are denoted by the same reference numerals while detailed descriptions thereof are not repeated. The aforementioned three-dimensional data generation apparatus 40, 50 may be provided with an undisturbed-state data using function analogous to that of the three-dimensional data generation apparatus 80. The monitoring system 20 of FIG. 2 may also include the three-dimensional data generation apparatus 80 instead of the three-dimensional data generation apparatus 10.

The three-dimensional data generation apparatus 80 has a configuration so as to repeatedly carry out a data generation operation over an arbitrary period of time, the data generation operation including the obtaining of the measured coordinates M executed by the measured coordinates obtaining section 14 and the assigning of the representative height H executed by the subdivision information preparing section 16, by using the measurement data from the three-dimensional sensor 12 that continuously measures the observation area 22 (FIG. 2) over an arbitrary period of time. The three-dimensional data generation apparatus 80 includes, in addition to the measured coordinates obtaining section 14 and the subdivision information preparing section 16, an undisturbed-state data holding section 82 configured to hold, as undisturbed-state data Dq, measurement data D acquired by measuring the observation area 22, in which only an object OB continuously immovable at a predetermined position is present (i.e., in an undisturbed state), and an undisturbed-state height holding section 84 configured to hold, as a undisturbed-state height Hq, a representative height H assigned by the subdivision information preparing section 16 to a subdivision 38 containing the X-Y coordinate values of the measured coordinates M obtained by the measured coordinates obtaining section 14 based on the measurement data D acquired by measuring the observation area 22 in the undisturbed state.

The measured coordinates obtaining section 14 operates, when it obtains the measured coordinates M of the object OB in the three-axis rectangular coordinate system 34 based on the measurement data D from the three-dimensional sensor 12 in each data generation operation, and each time a current measurement data D outputted from each of the light-receiving elements of the camera 24 of the three-dimensional sensors 12, to refer to a storage region provided for each light-receiving element in the undisturbed-state data holding section 82. The measured coordinates obtaining section 14 then compares the current measurement data D with the undisturbed-state data Dq for each light-receiving element and, when the current measurement data D has changed from the undisturbed-state data Dq, obtains the measured coordinates M based on the current measurement data D. When the current measurement data D of the light-receiving element is compared with the undisturbed-state data Dq and the current measurement data D has not changed from the undisturbed-state data Dq, the measured coordinates obtaining section 14 does not perform an obtainment of the measured coordinates M in connection with the said light-receiving element. The above configuration may be modified in such a manner that, in the step of comparing the current measurement data D with the undisturbed-state data Dq, a permissible value of a variation is previously set in consideration of dimensions of the object OB to be measured, a measurement or arithmetic error, a required precision of the three-dimensional data, etc., and if the current measurement data D has changed from the undisturbed-state data Dq beyond the permissible value, the above-described procedure is carried out based on the current measurement data D.

The subdivision information preparing section 16 operates in each data generation operation to assign, to a subdivision containing the X-Y coordinate values of the measured coordinates M obtained based on the current measurement data D, a Z value of the same measured coordinates M as the representative height H. Further, the subdivision information preparing section 16 operates when a single data generation operation is finished, in connection with a subdivision 38 not containing the X-Y coordinate values of the measured coordinates M obtained based on the current measurement data D (e.g., the subdivision 381 in FIG. 4), to extract the undisturbed-state height Hq of a subdivision 38 containing the same X-Y coordinate values from the undisturbed-state height holding section 84 and assign, to the said subdivision 38, the extracted undisturbed-state height Hq as the representative height H.

When the three-dimensional sensor 12 measures the observation area 22 in a previously set measurement period, and if an object OB different from an object OB present in the observation area 22 in the undisturbed state is newly present in the observation area 22, a new blind spot may be found at a position that was not a blind spot in the undisturbed state, depending on a positional relationship between the camera 24 and the different object OB. In the three-dimensional data generation apparatus 80, it is possible to treat such a new blind spot as a subdivision 38 having the undisturbed-state height Hq instead of a subdivision 38 not having the representative height H, and thereby generate the three-dimensional data of the observation area 22. The above configuration is useful in the case where, for example, the monitoring system 20 gives weight to the detection of a new object OB entering into the observation area 22 more than the detection of a new blind spot in the observation area 22. Furthermore, only in the case where an object OB different from an object OB present in the observation area 22 in the undisturbed state is newly present in the observation area 22 during a single measurement period (i.e., the case where the current measurement data D of each light-receiving element has changed from the undisturbed-state data Dq), the measured coordinates obtaining section 14 obtains the measured coordinates M of the different object OB based on the current measurement data D. The subdivision information preparing section 16 assigns a representative height H (including the undisturbed-state height Hq) to only the subdivision 38, the state of which has changed from the undisturbed state due to the presence of the different object OB, by using the measured coordinates M obtained based on the current measurement data D. Thus, in the three-dimensional data generation apparatus 80, when an object OB is present in the observation area 22, which is different from an object OB in the undisturbed state, the three-dimensional data is generated only for subdivision 38, the state of which has changed from the undisturbed state accordingly, and therefore, it is possible to reduce a calculation amount and increase a processing speed in relation to the generation of the three-dimensional data.

Figure 16:
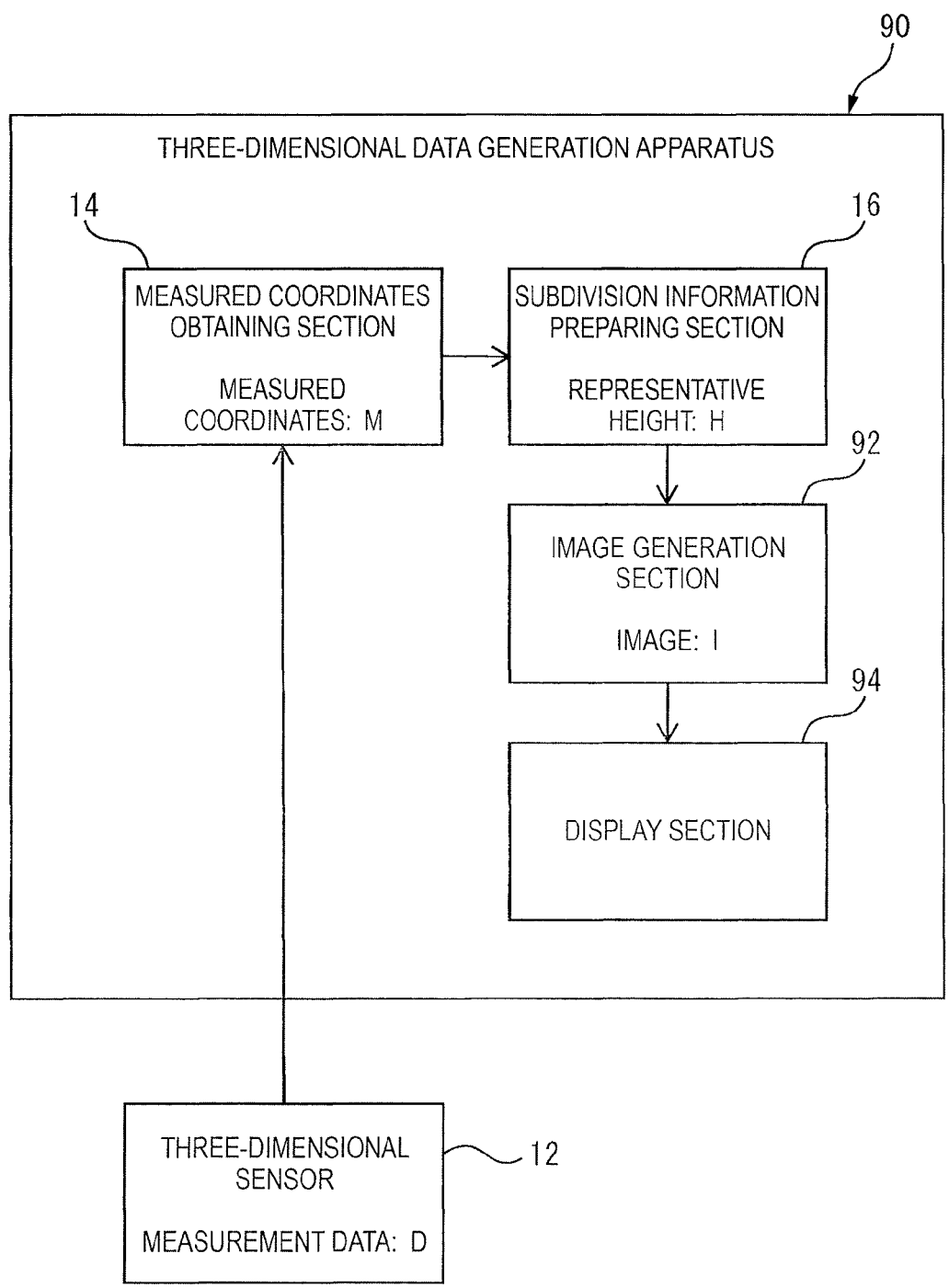
FIG. 16 is a functional block diagram illustrating yet another configuration example of a three-dimensional data generation apparatus.

FIG. 16 illustrates the configuration of a three-dimensional data generation apparatus 90 having a function of imaging and displaying the observation area 22 (FIG. 2) measured by the three-dimensional sensor 12. The three-dimensional data generation apparatus 90 is a further specific configuration example having the basic configuration of the aforementioned three-dimensional data generation apparatus 10, and corresponding components are denoted by the same reference numerals while detailed descriptions thereof are not repeated. The aforementioned three-dimensional data generation apparatus 40, 50, 70, 80 may be provided with an image display function analogous to that of the three-dimensional data generation apparatus 90. The monitoring system 20 of FIG. 2 may also include the three-dimensional data generation apparatus 90 instead of the three-dimensional data generation apparatus 10.

The three-dimensional data generation apparatus 90 includes, in addition to the measured coordinates obtaining section 14 and the subdivision information preparing section 16, an image generation section 92 configured to generate an image I of the observation area 22 including the object OB, by using the position and dimensions in the reference plane 36 (FIG. 4) and representative height H, of each of the plurality of subdivisions 38 (FIG. 4); and a display section 94 configured to display the image I generated by the image generation section 92. The image generation section 92 generates, based on the three-dimensional data of the observation area 22, the image I of the observation area 22 in the form of a single plan view as illustrated in FIG. 3B, in which the entire observation area 22 is captured as a bird's-eye view from a position at infinity vertically above the floor surface 28. The image generation section 92 may also image the height information (i.e., the magnitude of the representative height H) of the objects OB present in the observation area 22 in an identifiable manner by using color (brightness, saturation, hue), hatching, etc. The display section 94 may display the image I in a built-in or external display unit (not illustrated), such as a liquid-crystal display, an organic EL display, etc. The display section 94 may display the subdivision 38 not assigned with the representative height H by the subdivision information preparing section 16 (i.e., a blind spot) in a form distinguishable from the object OB in the image I.

Figure 17A:
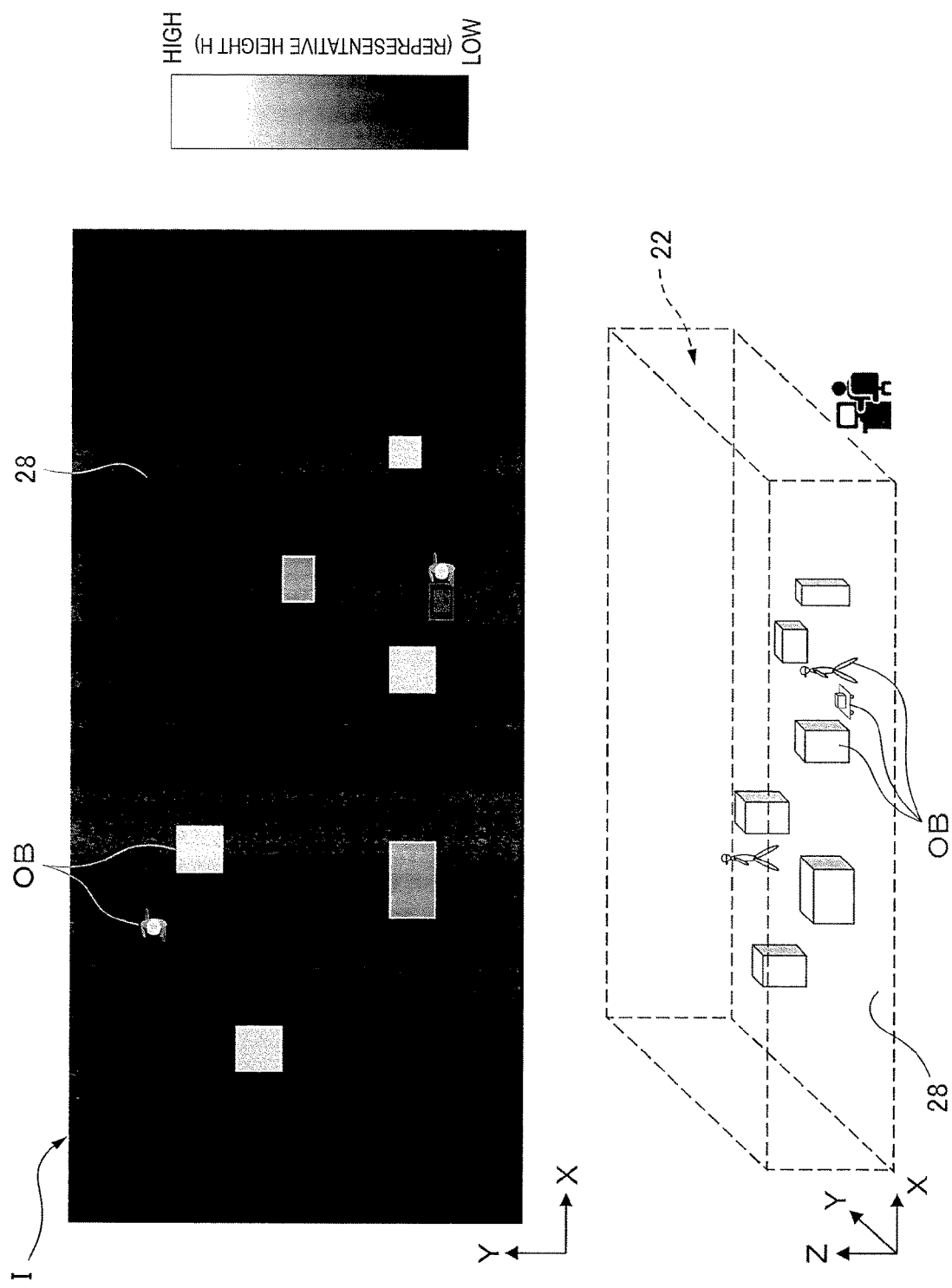
FIG. 17A is a diagram illustrating an example of an image displayed by the three-dimensional data generation apparatus of FIG. 16.
Figure 17B:
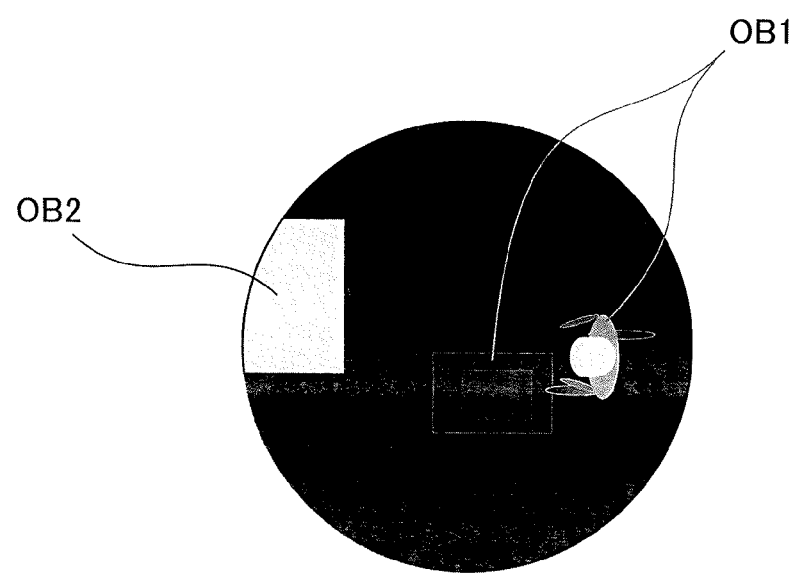
FIG. 17B is a diagram illustrating a part of the image of FIG. 17A in an enlarged manner.

FIG. 17A illustrates an example of the image I of the observation area 22 displayed by the display 94, along with a schematic view of the observation area 22 measured by the three-dimensional sensor 12. FIG. 17B illustrates a part of the image I in an enlarged manner. In the illustrated example, the image I expresses the height information of the object OB (the magnitude of the representative height H) by a difference in color (brightness). As illustrated, the three-dimensional data generation apparatus 90 can image the entire observation area 22 as a single plan view, regardless of the number of the three-dimensional sensors 12. The three-dimensional data generation apparatus 90 can also image and display a moving object OB1 (FIG. 17B) present in the observation area 22 while tracking the moving object OB1 in real time, and image and display a mode of change in distance between the moving object OB1 and an immovable structure OB2 (FIG. 17B) while tracking the mode in real time. If the three-dimensional data generation apparatus 90 is provided additionally with the undisturbed-state data using function of the three-dimensional data generation apparatus 80 illustrated in FIG. 15, it is possible to display an image I having no blind spot as a whole, as illustrated.

In the three-dimensional data generation apparatus 90, the display section 94 displays the image I of the observation area 22 in the form of a single plan view, and therefore it is possible, for example, for an observer observing the image I to visually recognize a blind spot present in the observation area 22, or grasp a distance between the objects OB. Furthermore, when the monitoring system 20 is equipped with the three-dimensional data generation apparatus 90, it is possible for an observer observing the image I to visually monitor the movement of object OB in the observation area 22, the entry of new object OB into the observation area 22, etc.

While the embodiments of the present invention have been described with reference to the drawings, the present invention is not limited to the illustrated configurations, and various modifications may be made. For example, considering that an electronic device has a generic property such that a value in a storage region tends to be unstable when the power is turned on. Therefore, it may be useful to perform an initialization process for the selecting condition storage section 44, the height storage section 46, the sensor information storage section 52 or the past data storage section 72, at the startup of the three-dimensional data generation apparatus 40, 50 or 70, and thereby to delete data stored in the storage region or place the storage region into a nullified state. Data can be stored in the storage region after the initialization process, whereby it is possible to eliminate the influence of instability at the time of startup.

While the invention has been described with reference to specific embodiments, it will be understood, by those skilled in the art, that various changes or modifications may be made thereto without departing from the scope of the following claims.

The invention claimed is:

1. A three-dimensional data generation apparatus configured to generate three-dimensional data used for recognizing an object present in an observation area, the apparatus comprising:
a processor configured to:
obtain measured coordinates of the object in a three-axis rectangular coordinate system set in the observation area, based on measurement data from a three-dimensional sensor measuring the observation area;
define a reference plane parallel to an X-Y plane of the three-axis rectangular coordinate system in the observation area, uniformly divide the reference plane into a plurality of subdivisions, and assign to a subdivision, among the plurality of subdivisions, that contains X-Y coordinate values of the measured coordinates of the object, a Z value of the same measured coordinates as a representative height of the subdivision; and
store the representative height for each of the plurality of subdivisions,
wherein the three-dimensional data generation apparatus is configured to repeatedly carry out a data generation operation over an arbitrary period of time, the data generation operation including obtaining the measured coordinates and assigning the representative height,
wherein the processor is further configured to place a storage region, which is provided for a subdivision not assigned with the representative height, into a nullified state in each data generation operation, and
wherein three-dimensional data of the observation area is generated by using a position and dimensions in the reference plane and the stored representative height, of each of the plurality of subdivisions.

2. The three-dimensional data generation apparatus of claim 1,
wherein the processor is further configured to, in a case where a single subdivision contains the X-Y coordinate values of a plurality of measured coordinates, select single measured coordinates from the plurality of measured coordinates in accordance with a predetermined condition,
wherein the processor is further configured to use a Z value of the selected measured coordinates as the representative height.

3. The three-dimensional data generation apparatus of claim 2,
wherein the processor is further configured to select the measured coordinates having a distance shortest to the three-dimensional sensor, from among the plurality of measured coordinates of which the X-Y coordinate values are contained in the single subdivision.

4. The three-dimensional data generation apparatus of claim 3,
wherein the processor is further configured to store, for each of the plurality of subdivisions, the distance from each of the plurality of measured coordinates, of which the X-Y coordinate values are contained in each subdivision, to the three-dimensional sensor or to the center point.

5. The three-dimensional data generation apparatus of claim 4, configured to repeatedly carry out a data generation operation over an arbitrary period of time, the data generation operation including obtaining the measured coordinates and assigning the representative height,
wherein the processor is further configured to place a storage region provided for each subdivision into a nullified state, when a single data generation operation has finished.

6. The three-dimensional data generation apparatus of claim 2,
wherein the processor is further configured to select the measured coordinates having a distance shortest to a center point of the single subdivision, from among the plurality of measured coordinates of which the X-Y coordinate values are contained in the single subdivision.

7. The three-dimensional data generation apparatus of claim 1, configured to repeatedly carry out a data generation operation over an arbitrary period of time, the data generation operation including obtaining the measured coordinates and assigning the representative height,
wherein the processor is further configured to store the measurement data as past data,
wherein the processor is further configured to, in each data generation operation, compare current measurement data with the past data and, when the current measurement data has changed from the past data, obtain the measured coordinates based on the current measurement data and update the past data with the current measurement data, and
wherein the processor is further configured to assign, to a subdivision containing the X-Y coordinate values of the measured coordinates obtained based on the current measurement data, a Z value of the same measured coordinates as the representative height.

8. The three-dimensional data generation apparatus of claim 1, configured to repeatedly carry out a data generation operation over an arbitrary period of time, the data generation operation including obtaining the measured coordinates and assigning the representative height, wherein the processor is further configured to hold, as undisturbed-state data, the measurement data acquired by measuring the observation area in which only an object continuously immovable at a predetermined position is present, wherein the processor is further configured to hold, as a undisturbed-state height, the representative height assigned to the subdivision containing the X-Y coordinate values of the measured coordinates obtained based on the measurement data acquired by measuring the observation area in which only an object continuously immovable at a predetermined position is present, wherein the processor is further configured to, in each data generation operation, compare current measurement data with the undisturbed-state data and, when the current measurement data has changed from the undisturbed-state data, obtain the measured coordinates based on the current measurement data, and wherein the processor is further configured to assign, to a subdivision containing the X-Y coordinate values of the measured coordinates obtained based on the current measurement data, a Z value of the same measured coordinates as the representative height, and assign, to a subdivision not containing the X-Y coordinate values of the measured coordinates obtained based on the current measurement data, the undisturbed-state height of the subdivision containing the same X-Y coordinate values as the representative height.

9. The three-dimensional data generation apparatus of claim 1, wherein the processor is further configured to previously store sensor information including a position and image capturing direction of the three-dimensional sensor in the three-axis rectangular coordinate system, and wherein the processor is further configured to convert the measurement data into the measured coordinates based on the sensor information.

10. The three-dimensional data generation apparatus of claim 1, wherein the processor is further configured to:

generate an image of the observation area including the object, by using the position, the dimensions and the representative height of each of the plurality of subdivision, and display the image.

11. The three-dimensional data generation apparatus of claim 10, wherein the processor is further configured to display the subdivision not assigned with the representative height in a form distinguishable from the object in the image.

12. A monitoring system comprising:

a three-dimensional sensor configured to measure an observation area; and the three-dimensional data generation apparatus of claim 1, wherein the observation area is monitored by using the three-dimensional data generated by the three-dimensional data generation apparatus.

13. A three-dimensional data generation method of generating three-dimensional data used for recognizing an object present in an observation area, the method comprising:

obtaining measured coordinates of the object in a three-axis rectangular coordinate system set in the observation area, based on measurement data from a three-dimensional sensor measuring the observation area;

defining a reference plane parallel to an X-Y plane of the three-axis rectangular coordinate system in the observation area, uniformly dividing the reference plane into a plurality of subdivisions, and assigning to a subdivision, among the plurality of subdivisions, that contains X-Y coordinate values of the measured coordinates of the object, a Z value of the same measured coordinates as a representative height of the subdivision;

storing the representative height for each of the plurality of subdivisions;

repeatedly carrying out a data generation operation over an arbitrary period of time, the data generation operation including obtaining the measured coordinates and assigning the representative height;

placing a storage region, provided for a subdivision not assigned with the representative height, into a nullified state in each data generation operation; and generating three-dimensional data of the observation area by using a position and dimensions in the reference plane and the stored representative height, of each of the plurality of subdivisions.

\* \* \* \* \*